United States Patent
Rivers, Jr.

[19]

[11] Patent Number: 6,102,193
[45] Date of Patent: Aug. 15, 2000

[54] METHOD AND APPARATUS FOR PROVIDING PARTS TO WORKPIECES

[76] Inventor: Ernest M. Rivers, Jr., 13281 Warner Rd., Perry, Mich. 48872

[21] Appl. No.: 09/109,296

[22] Filed: Jun. 30, 1998

[51] Int. Cl.[7] .......................... B65G 15/58; B65G 25/00; B65G 1/33; B65G 1/133
[52] U.S. Cl. ................................ 198/750.13; 198/468.5; 414/749.2; 414/751.1
[58] Field of Search ........................... 198/750.13, 468.5; 414/749.2, 751.1

[56] References Cited

U.S. PATENT DOCUMENTS

| | | |
|---|---|---|
| 2,623,974 | 12/1952 | Prucha . |
| 3,115,239 | 12/1963 | Wright . |
| 3,293,402 | 12/1966 | Graham . |
| 3,456,424 | 7/1969 | Thurston et al. . |
| 3,457,693 | 7/1969 | Jackson . |
| 3,838,770 | 10/1974 | Caffa . |
| 4,020,316 | 4/1977 | Schaft et al. . |
| 4,266,653 | 5/1981 | Mergl . |
| 4,609,805 | 9/1986 | Tobita et al. . |
| 4,629,054 | 12/1986 | Kondo . |
| 4,633,995 | 1/1987 | Hamada . |
| 4,754,116 | 6/1988 | Naruse et al. . |
| 4,789,768 | 12/1988 | Tobita et al. . |
| 4,878,575 | 11/1989 | McDonald et al. . |
| 4,943,098 | 7/1990 | Aoyama ............................ 294/65.5 X |
| 5,007,795 | 4/1991 | Yoshimura ......................... 414/737 X |
| 5,067,763 | 11/1991 | Aoyama ............................. 294/65.5 X |
| 5,074,742 | 12/1991 | Aoyama ............................. 414/737 X |
| 5,359,171 | 10/1994 | Aoyama . |
| 5,688,414 | 11/1997 | Kondo . |

*Primary Examiner*—Christopher P. Ellis
*Assistant Examiner*—Kenneth W. Bower
*Attorney, Agent, or Firm*—Mary M. Moyne; Ian C. McLeod

[57] ABSTRACT

The method and apparatus (10) for moving and positioning parts (150, 250, 350 or 450) on workpieces (160) is described. The apparatus includes a vibratory bowl (12), a conveyance and feed system and a positioning cylinder (82). The bowl aligns the parts and orients the parts using a gauge (16, 216, 316 or 416). The conveyance and feed system moves the parts through a conduit (34) using an escapement (44) to feed the parts one at a time to the positioning cylinder. The positioning cylinder has a pneumatic piston (90) with a piston rod (100) having an extension (102) and tip (104). An electromagnet (112) is mounted at one end of the positioning cylinder. When activated, the positioning cylinder extends the piston rod such that the tip extends into an opening (150D, 250D, 350D or 450D) in the part. The electromagnet is activated simultaneously and sends a charge down the piston rod which charges the extension which is constructed of a magnetic material. The part is held on the tip by the magnetic attraction to the extension. When the forward movement of the piston rod stops, the forward inertia of the part overcomes the magnetic attraction and moves the part off the tip to the workpiece.

10 Claims, 12 Drawing Sheets

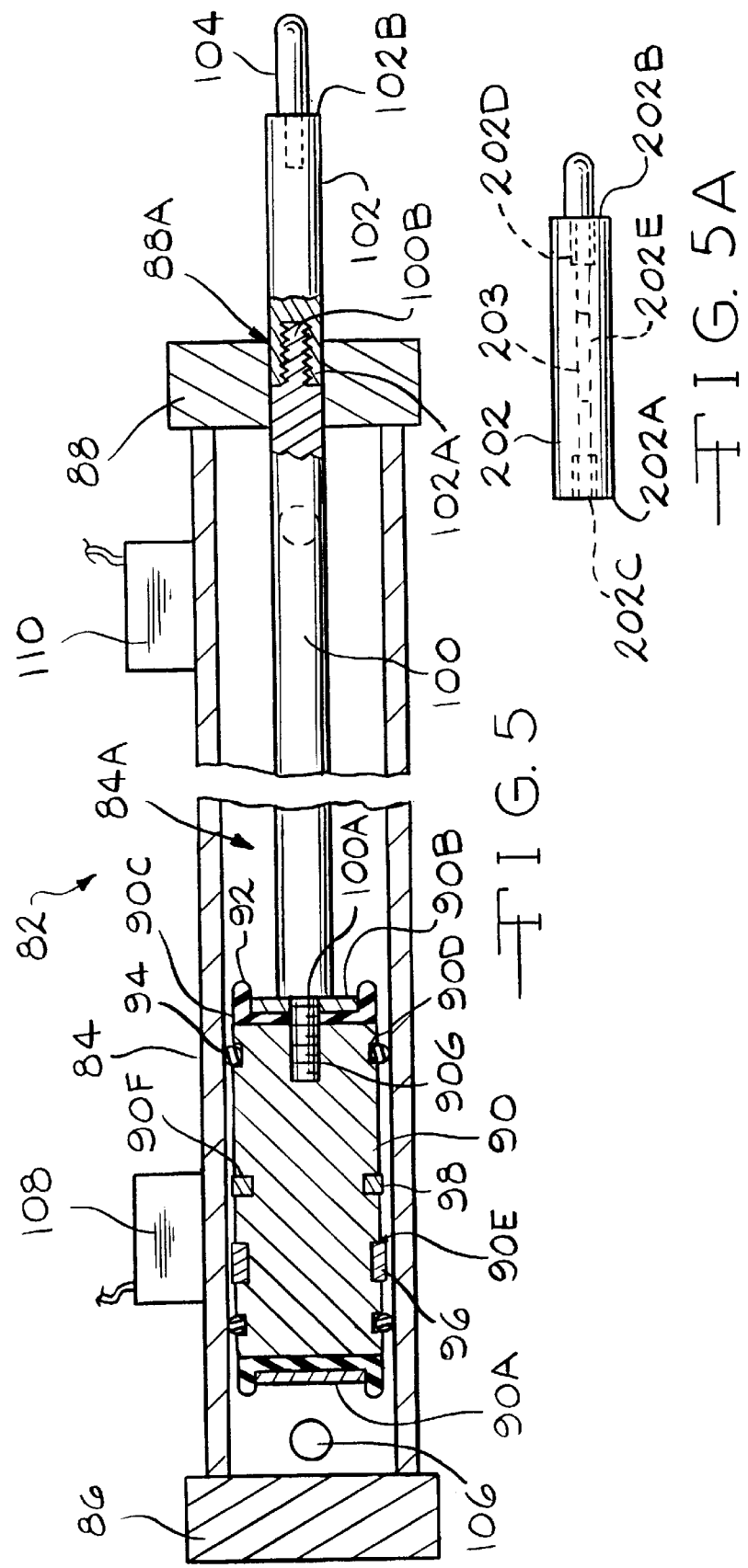

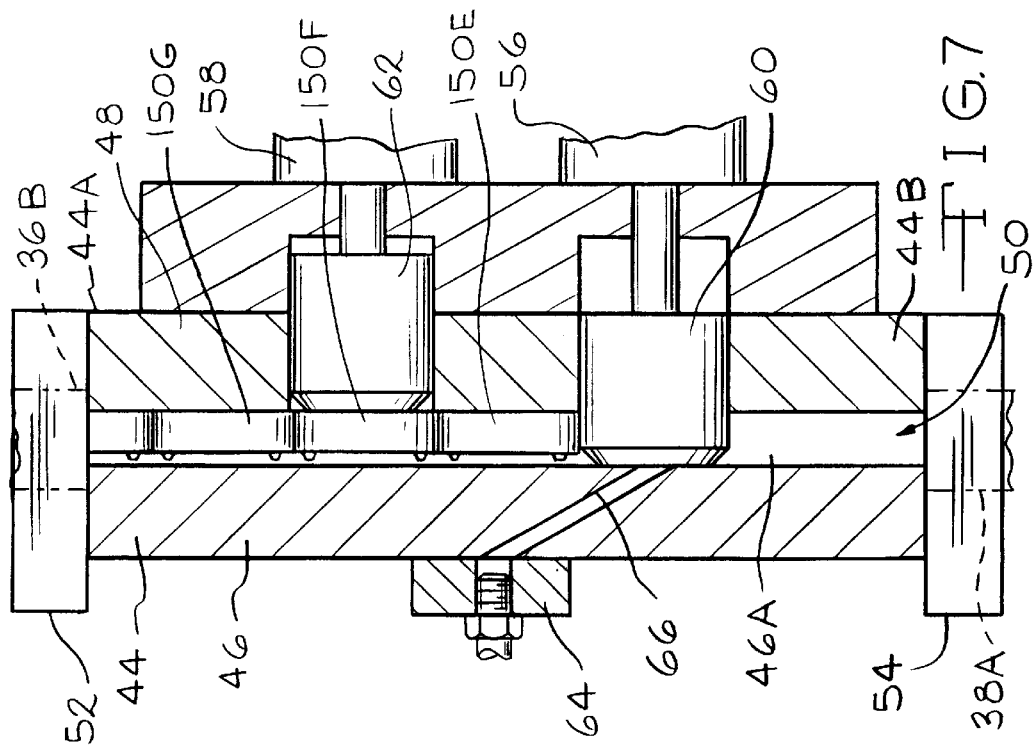
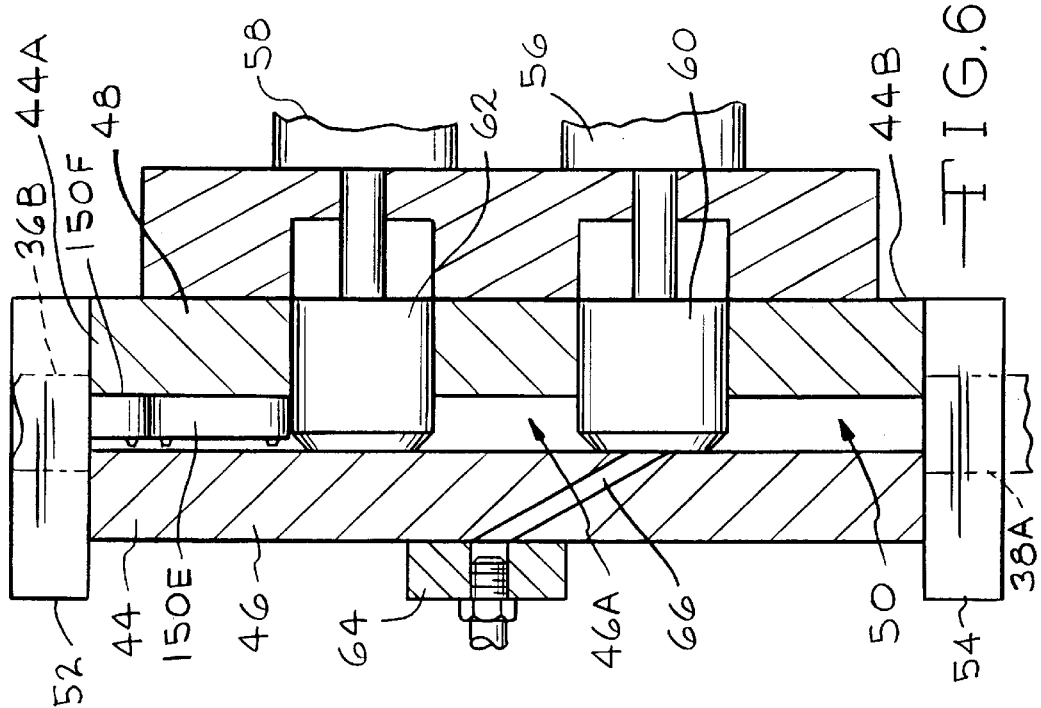

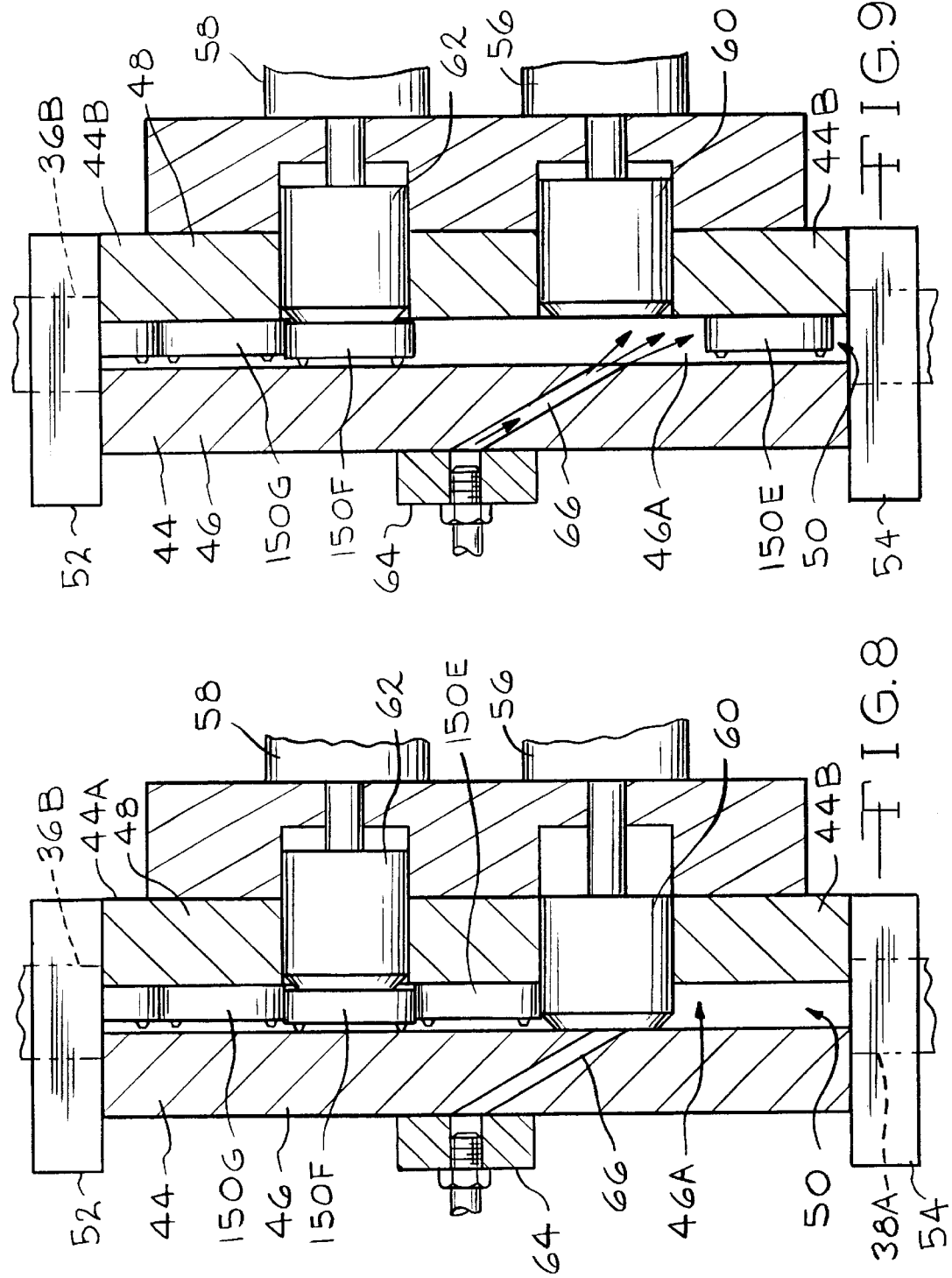

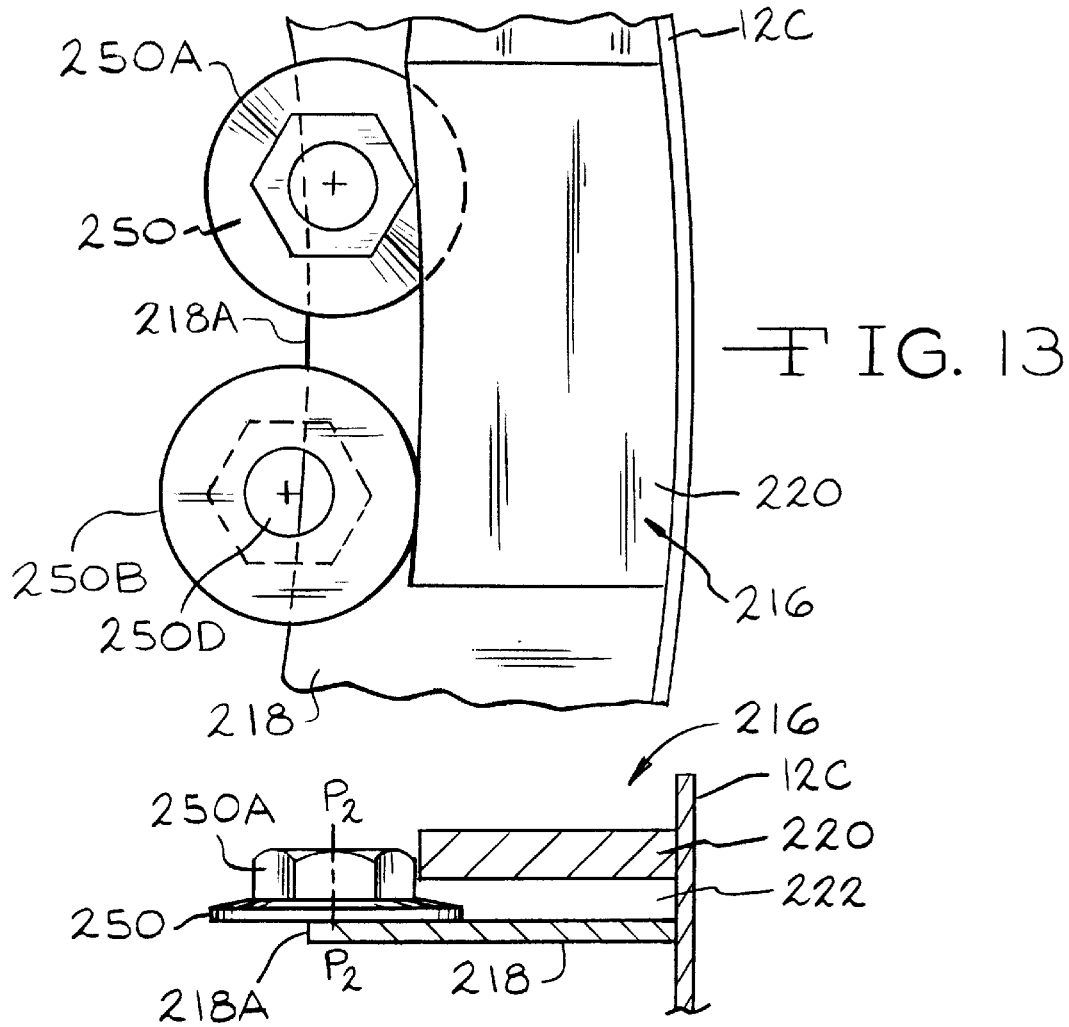
FIG. 13
FIG. 14
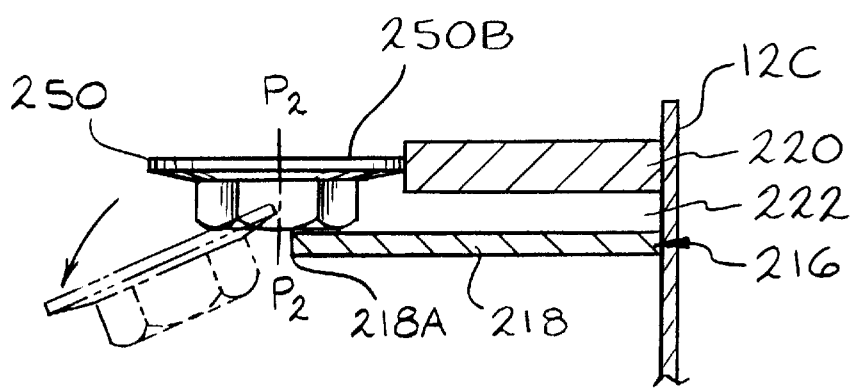
FIG. 15

METHOD AND APPARATUS FOR PROVIDING PARTS TO WORKPIECES

BACKGROUND OF THE INVENTION (1) Field of the Invention

The present invention relates to a method and apparatus for conveying, feeding and positioning parts to workpieces. In general, the parts are to be welded onto the workpieces. The method and apparatus includes a vibratory bin for orientating the parts, a conveyance and feed system for conveying and feeding the parts one at a time to a positioning cylinder which moves the individual parts to the workpieces. The vibratory bowl moves the parts into a row and uses a gauge to ensure that the parts have the correct orientation. The conveyance and feed system moves the parts from the bowl to the positioning cylinder, separates the parts and holds the parts to ensure that the individual parts are fed at a predetermined rate to the positioning cylinder. The positioning cylinder moves each separate part to each workpiece and deposits the part on the workpiece. The positioning cylinder uses magnetism to hold the parts during movement of the parts toward the workpieces. The positioning cylinder then uses the forward inertia of the parts to deposit the parts on the workpieces.

(2) Description of the Related Art

The related art has shown various types of positioning apparatus for positioning parts on workpieces. Illustrative are U.S. Pat. No. 2,623,974 to Prucha; U.S. Pat. No. 3,293,402 to Graham; U.S. Pat. No. 4,020,316 to Schaft et al; U.S. Pat. No. 4,609,805 to Tobita et al; U.S. Pat. No. 4,754,116 to Naruse et al; U.S. Pat. No. 4,789,768 to Tobita et al; U.S. Pat. No. 5,359,171 to Aoyama and U.S. Pat. No. 5,688,414 to Kondo.

In particular, Kondo describes a stud welding apparatus which uses an electromagnet to pull and hold the flanged stud in the collet. The stud is also held in the collet by the gripping force of a resilient gripper located in the bore of the collet. The apparatus uses a pneumatic piston to move the collet with the stud toward the panel to which the stud is to be mounted.

In addition, Naruse et al describes a projection welder for welding a nut to one side of a work. The welder includes a parts feeder connected by a flexible feeder tube to a feeder head which feeds nuts to the lower electrode of the welder. When the preceding operation has been completed and the upper electrode has been lifted, a signal to the succeeding nut is emitted. Simultaneously, the electromagnetic coil is energized to magnetize the push rod so that the shoulder surface at the front end portion of the push rod is also magnetized. The cylinder is activated to move the piston rod, the connector and the push rod forward which moves the front end portion of the push rod into the lower part of the chute through an opening. Thus, the nut turning portion at the front end portion of the push rod is inserted into the threaded hole in the lowermost nut in the chute and the shoulder surface on the push rod is brought into abutment engagement with the lowermost nut whereby the nut is magnetically held on the nut turning portion.

The forward movement of the piston rod is continued and the lowermost nut is removed from the chute. When the push rod has been moved to a position in which the front face of the nut is close to the nut centering pin on the lower electrode, a sensor is operated to de-energize the electromagnetic coil so that the push rod is demagnetized. However, the nut is held on the front end portion of the push rod due to the inertia produced by the thrust force of the shoulder surface. The forward movement of the push rod is further continued to bring the front face of the lower part of the nut on the rod into engagement with the nut centering pin so that the movement of the nut is now blocked by the pin. Further movement of the push rod moves the upper part of the nut so that the nut is rotated counterclockwise over an angle of about 90 degrees about the lower part thereof until the nut is placed on the top face of the electrode tip with the threaded hole in the nut receiving the nut centering pin. Thus, the nut makes contact with the lower electrode and is rotated off the end of the rod.

The related art has also shown several different types of vibrating bowls for use with feed and conveyance machines. Illustrative are U.S. Pat. No. 3,115,239 to Wright; U.S. Pat. No. 3,456,424 to Thurston et al; U.S. Pat. No. 3,457,693 to Jackson; U.S. Pat. No. 3,838,770 to Caffa; U.S. Pat. No. 4,266,653 to Mergl; U.S. Pat. No. 4,629,054 to Kondo; U.S. Pat. No. 4,633,995 to Hamada and U.S. Pat. No. 4,878,575 to McDonald et al.

In particular, Hamada shows a parts feeder having a vibrating bowl. The bowl has a helical parts feeding track extending from the center of the inner bottom of the bowl helically up to a parts outlet in an upper peripheral wall of the bowl.

Further, Caffa shows a vibrating bowl which has a spiral track mounted on the inside. The bowl can have auxiliary devices fitted on any point of the inner wall of the container. The devices may be orientating means, overflows, level indicators, sensors, selectors, orientating and selector devices, automatic column breakers, gauges, counters, etc. which allow for counting the workpieces, determining the absence or presence of workpieces and keeping account of the features of the workpieces.

Finally, Mergl shows the use of gravity and pressurized air to move workpieces along the chute components of a feed system.

Also of interest is U.S. Pat. No. 5,248,869 to DeBell et al which shows a composite weld nut locating pin.

There remains the need for an apparatus and method for moving parts to workpieces which has a vibratory bowl for orientating the parts, a feed and conveyance system for moving the individual parts at a predetermined rate from the bowl and a positioning cylinder which holds each individual part using magnetism and which deposits the part on the workpiece using the forward inertia of the part.

SUMMARY OF THE INVENTION

The present invention is a method and apparatus for conveying, feeding and positioning correctly orientated parts to workpieces. The method and apparatus uses a vibratory bowl to arrange the parts in a single file row. The bowl has a gauge which removes parts having the incorrect orientation from the row. It is important to correctly orient the parts to ensure correct operation of the remainder of the apparatus and to ensure that the parts are positioned on the workpieces with the correct orientation. The vibratory bowl allows for quick and accurate sorting and orientating of the parts. The parts move from the bowl into a conveyance and feed system. The conveyance and feed system moves the parts from the bowl to the positioning cylinder and ensures that the parts are fed at correct intervals at the positioning cylinder. The conveyance and feed system uses an escapement to separate and feed the individual parts. The escapement uses a series of pneumatic pistons to hold the parts and block the path of the parts to prevent the parts from randomly moving to the positioning cylinder. The positioning cylinder moves the parts from the conveyance and feed system to the workpieces and deposits the parts on the workpieces. The positioning cylinder uses magnetic attraction between the parts and a portion of the piston rod of the positioning cylinder to hold the parts on the piston rod. The magnetic attraction enables the positioning cylinder to move the parts to the workpieces at any angle without fear that gravity will act to move the parts off the piston rod. The strength of the magnetic attraction is such that the parts will move off the piston rod due to the forward inertia of the parts when the positioning rod stops moving forward.

The substance and advantages of the present invention will become increasingly apparent by reference to the following drawings and the description.

BRIEF DESCRIPTION OF THE DRAWING(S)

FIG. 1 is a perspective view of the apparatus 10 without the positioning cylinder 82 showing the vibratory bowl 12 and the escapement 44.

FIG. 2 is a perspective view of the vibratory bowl 12 showing the level sensor 26.

FIG. 3 is an enlarged, cross-sectional view along the line 3—3 of FIG. 2 showing the parts outlet 20 in the vibratory bowl 12, the connection of the conveyor conduit 34 and the air assist jet 21.

FIG. 4 is a front view of the positioning cylinder 82 and the end track 72 having a cut away cross-sectional portion showing the electromagnet 112 and the parts 150 and showing the movement of the piston rod 100 and holding door 118 in phantom.

FIG. 4A is an exploded view of the end track 72 showing the part positioner 78.

FIG. 5 is a cross-sectional view of the positioning cylinder 82 showing the piston 90, the piston rod 100 and the tip 104.

FIG. 5A is a side view of an extension 202 of an alternate embodiment.

FIG. 6 is a cross-sectional view of the escapement 44 in the initial, start up position showing the first and second piston blocks 60 and 62 extended into the passageway 50.

FIG. 7 is a cross-sectional view of the escapement 44 showing the first piston block 60 extended into the passageway 50 and the second piston block 62 retracted to allow the parts 150 to move along the passageway 50.

FIG. 8 is a cross-sectional view of the escapement 44 showing the second piston block 62 partially extended into the passageway 50 such as to contact and hold the second part 150F in the passageway 50.

FIG. 9 is a cross-sectional view of the escapement 44 showing the first piston block 60 retracted to allow the first part 150E to exit the escapement 44 and the second piston block 62 partially extended to hold the second part 150F in the passageway 50 in the escapement 44.

FIG. 10 is a top view of the gauge 16 of the first embodiment showing parts 150 having correct and incorrect orientations 150A and 150B.

FIG. 11 is a cross-sectional view along the line 11—11 of FIG. 10 showing the gauge 16 with a part 150 having an incorrect orientation 150B.

FIG. 12 is a cross-sectional view along the line 12—12 of FIG. 10 showing the gauge 16 with a part 150 moving along the gauge 16 having a correct orientation 150A.

FIG. 13 is a top view of the gauge 216 of the second embodiment with the parts 250 in the correct and incorrect orientations 250A and 250B.

FIG. 14 is a cross-sectional view along the line 14—14 of FIG. 13 showing the parts 250 having the correct orientation 250A.

FIG. 15 is a cross-sectional view along the line 15—15 of FIG. 13 showing the parts 250 having an incorrect orientation 250B.

Figure 16:
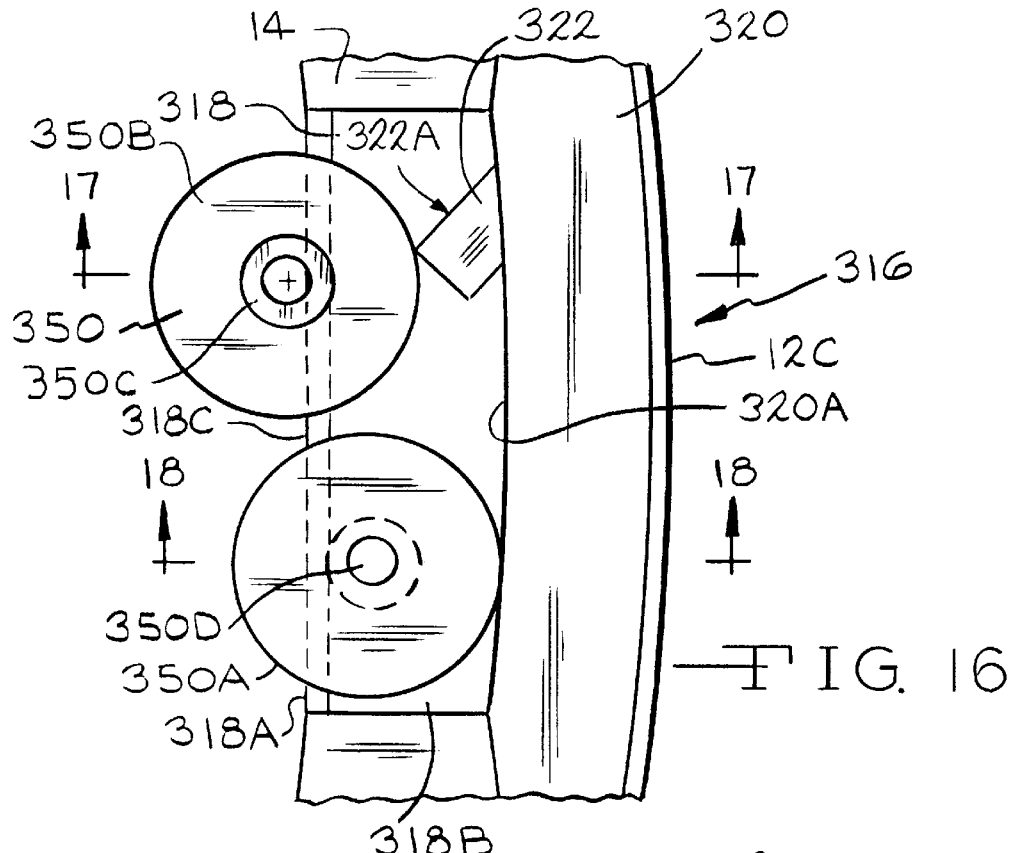

FIG. 16 is a top view of the gauge 316 of the third embodiment showing the ejector 322 and parts 350 having correct and incorrect orientations 350A and 350B.

Figure 17:
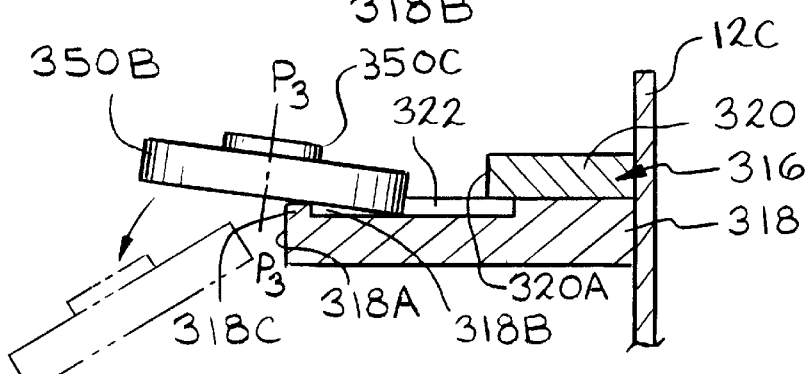

FIG. 17 is a cross-sectional view along the line 17—17 of FIG. 16 showing the parts 350 having the incorrect orientation 350B.

Figure 18:
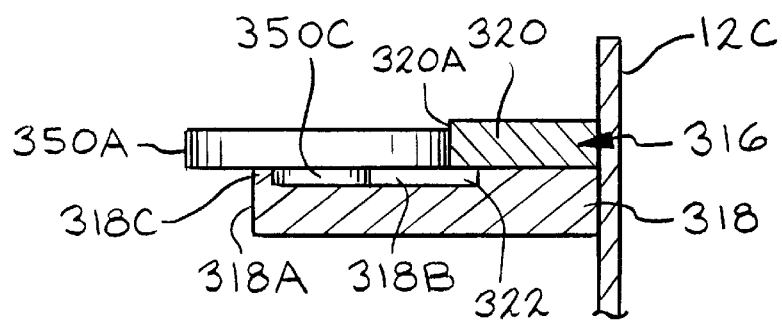

FIG. 18 is a cross-sectional view along the line 18—18 of FIG. 16 showing the parts 350 having the correct orientation 350A.

Figure 19:
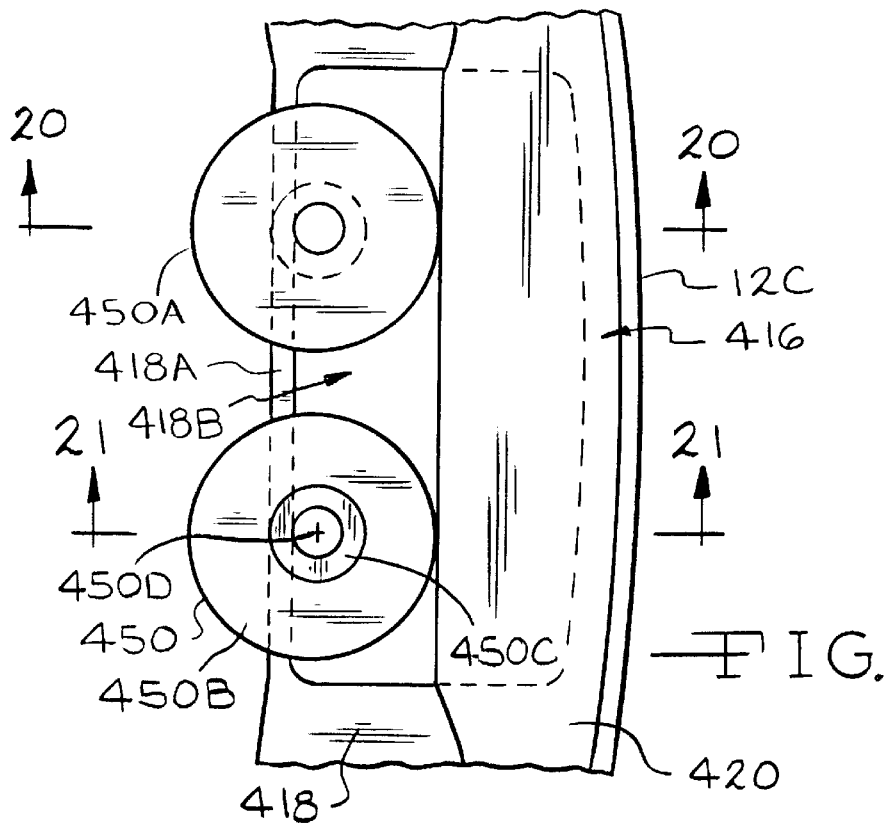

FIG. 19 is a top view of the gauge 416 of the fourth embodiment showing parts 450 having correct and incorrect orientations 450A and 450B.

Figure 20:
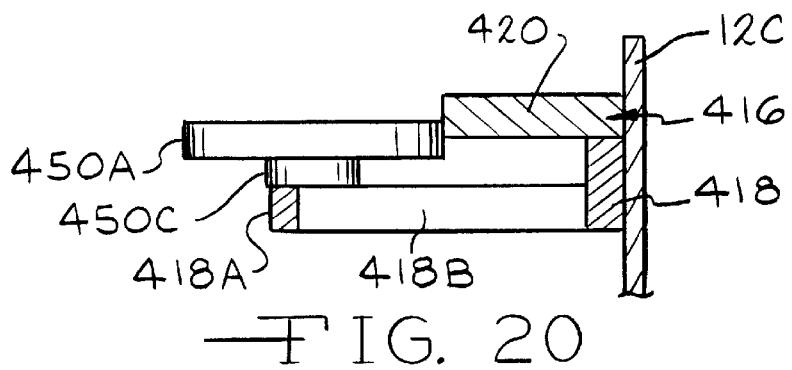

FIG. 20 is a cross-sectional view along the line 20—20 of FIG. 19 showing the parts 450 having the correct orientation 450A.

Figure 21:
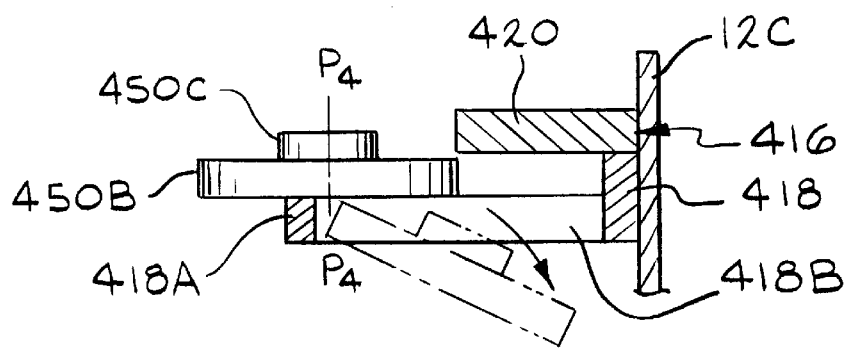

FIG. 21 is a cross-sectional view along the line 21—21 of FIG. 19 showing the parts 450 having the incorrect orientation 450B.

DESCRIPTION OF THE PREFERRED EMBODIMENT(S)

The present invention relates to an apparatus for sorting, feeding and positioning parts for attaching to workpieces, which comprises: a vibrating bin for sorting and orientating the parts into a row and moving the row of parts to an opening in the bin wherein the parts in the row have a similar orientation such that as the parts move through the opening in the bin, the parts have the same orientation; a conveyor means having opposed ends with one end adjacent the opening of the bin for moving the parts away from the bin; and a piston means located at the other end of the conveyor means for moving the parts from the conveyor means to the workpieces and positioning the parts on the workpieces at a specific point with a specific orientation, the piston means having a piston rod which holds the parts and an electromagnetic means for magnetizing a portion of the piston rod for holding the part adjacent the portion of the piston rod wherein the piston rod moves in a forward direction to position the parts adjacent the workpieces and stops moving to deposit the parts on the workpieces.

Further, the present invention relates to a piston apparatus for positioning parts for mounting on workpieces, which comprises: a piston cylinder having a first end and a second end; a piston rod having a first end and a second end with the first end slidably mounted in the piston cylinder for movement between the ends of the piston cylinder such that the piston rod moves along a longitudinal axis of the cylinder, the second end of the piston rod having a size such as to be easily inserted into an opening in the parts; and an electromagnetic means mounted on the piston cylinder adjacent the second end of the piston cylinder for magnetizing a portion of the piston rod adjacent the second end of the piston rod such that the parts are held adjacent the second end of the piston rod by magnetic attraction between the parts and the portion of the piston rod.

Still further, the present invention relates to a method for positioning and mounting parts on workpieces, which comprises the steps of: providing a vibrating bin for sorting and orientating the parts into a row and moving the row of parts to an opening in the bin wherein the parts in the row have a similar orientation such that as the parts move through the opening in the bin, the parts have the same orientation; a conveyor means having opposed ends with one end adjacent the opening of the bin for moving the parts away from the bin; and a piston means located at the other end of the conveyor means for moving the parts from the conveyor means to the workpieces and positioning the parts on the workpieces at a specific point with a specific orientation, the piston means having a piston rod which holds the parts and an electromagnetic means for magnetizing a portion of the piston rod for holding the part adjacent the portion of the piston rod wherein the piston rod moves in a forward direction to position the parts adjacent the workpieces and stops moving to deposit the parts on the workpieces; feeding the parts into the bin; sorting the parts in the bin such that the parts are aligned in a row and have the same orientation; moving the parts through the opening in the bin into the conveyor means; moving the parts along the conveyor means and feeding the parts individually at a predetermined rate to the piston means; holding the parts adjacent the piston means; activating the electromagnetic means such as to magnetize the portion of the piston rod; activating the piston means such that the piston rod moves toward the parts and contacts the parts and moves the parts to the workpieces; and depositing the parts on the workpieces.

Further still, the present invention relates to a apparatus for sorting and orientating parts, which comprises: a vibrating bin having an open top and a closed bottom with a sidewall extending therebetween having an inner surface, the sidewall having an opening adjacent the open top of the bin; a channel means mounted on the inner surface of the bin for moving the parts in a row from the bottom of the bin toward the top of the bin; and a gauge means mounted in the channel for removing the parts from the channel which have an incorrect orientation wherein the bin vibrates such as to move the parts along the channel from the bottom of the bin toward the opening in the sidewall of the bin and wherein the gauge acts to engage the parts such that parts having an incorrect orientation are removed from the channel and deposited back toward the bottom of the bin.

Further still, the present invention relates to a method for sorting and orientating parts, which comprises: a vibrating bin having an open top and a closed bottom with a sidewall extending therebetween having an inner surface, the sidewall having an opening adjacent the open top of the bin; a channel means mounted on the inner surface of the bin for moving the parts in a row from the bottom of the bin toward the top of the bin; and a gauge means mounted in the channel for removing the parts from the channel which have an incorrect orientation wherein the bin vibrates such as to move the parts along the channel from the bottom of the bin toward the opening in the sidewall of the bin and wherein the gauge acts to engage the parts such that parts having an incorrect orientation are removed from the channel and deposited back toward the bottom of the bin; feeding the parts into the bin; and activating the bin such that the bin vibrates and moves the parts along the channel wherein as the parts move along the channel the parts move across the gauge which removes parts having the incorrect orientation from the channel and wherein parts having an incorrect orientation are moved out of the bin through the opening in the sidewall of the bin.

Still further, the present invention relates to a apparatus for feeding parts at a predetermined rate, which comprises: a housing having opposed open ends with a bore extending therebetween along a longitudinal axis of the apparatus; a first piston means mounted between the ends of the housing such as to extend perpendicular to the longitudinal axis of the housing wherein when the first piston means is extended, the first piston means extends into the channel; and a second piston means mounted between the ends of the housing adjacent to and spaced apart from the first piston means such as to extend perpendicular to the longitudinal axis of the housing wherein when the second piston means is extended the second piston means extends into the channel.

Finally, the present invention relates to a method for separating and feeding parts at a predetermined rate, which comprises the steps of: providing a housing having opposed open ends with a bore extending therebetween along a longitudinal axis of the apparatus; a first piston means mounted between the ends of the housing such as to extend perpendicular to the longitudinal axis of the housing wherein when the first piston means is extended, the first piston means extends into the channel; and a second piston means mounted between the ends of the housing adjacent to and spaced apart from the first piston means such as to extend perpendicular to the longitudinal axis of the housing wherein when the second piston means is extended the second piston means extends into the channel; activating the first piston means such that the first piston extends into the channel and prevents the parts from moving beyond the first piston means in the channel; feeding a row of parts into the channel of the housing through one open end; activating the second piston means such as to extend the second piston means into the channel such that a first part is located between the first and second piston means and wherein the second piston means contacts a second part in the channel and holds the second part in place in the channel; deactivating the first piston means such that the first piston means moves out of the channel and the first part between the first and second piston means moves along the channel and out of the apparatus; activating the first piston means such that the first piston means extends into the channel and prevents the parts from moving beyond the second piston means in the channel; and deactivating the second piston means such that the second part is released and moved toward the first piston means and is located between the first and second piston means.

The apparatus 10 of the present invention is used to position a part 150, 250, 350 or 450 on a workpiece 160. The part 150, 250, 350 or 450 must be positioned on the workpiece 160 with the correct orientation and must be deposited on the workpiece 160 at a predetermined rate so that each workpiece 160 receives only one part 150, 250, 350 or 450. The apparatus 10 includes a vibratory bowl 12, a conveyance and feed system and a positioning cylinder 82.

Figure 1:
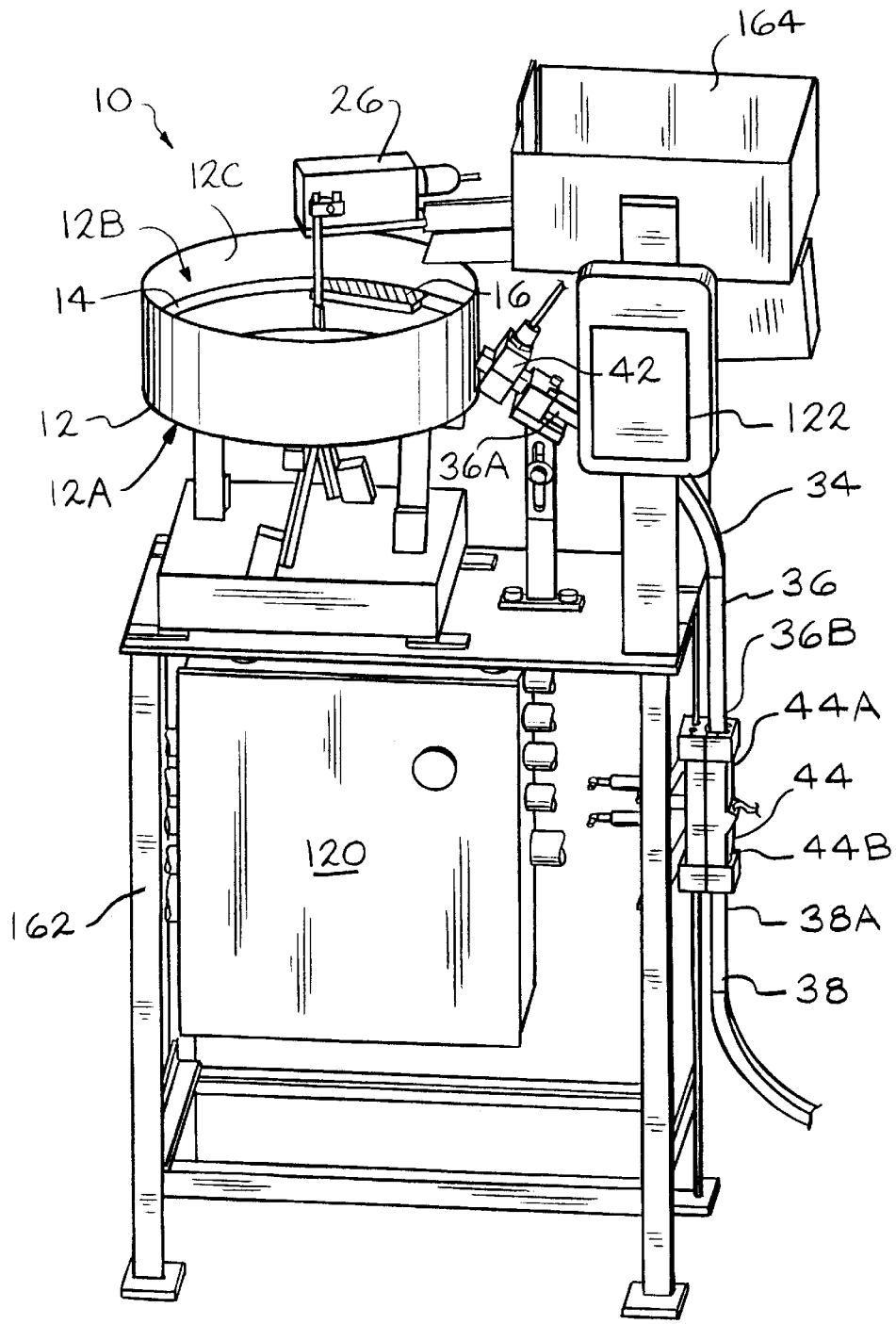
Figure 2:
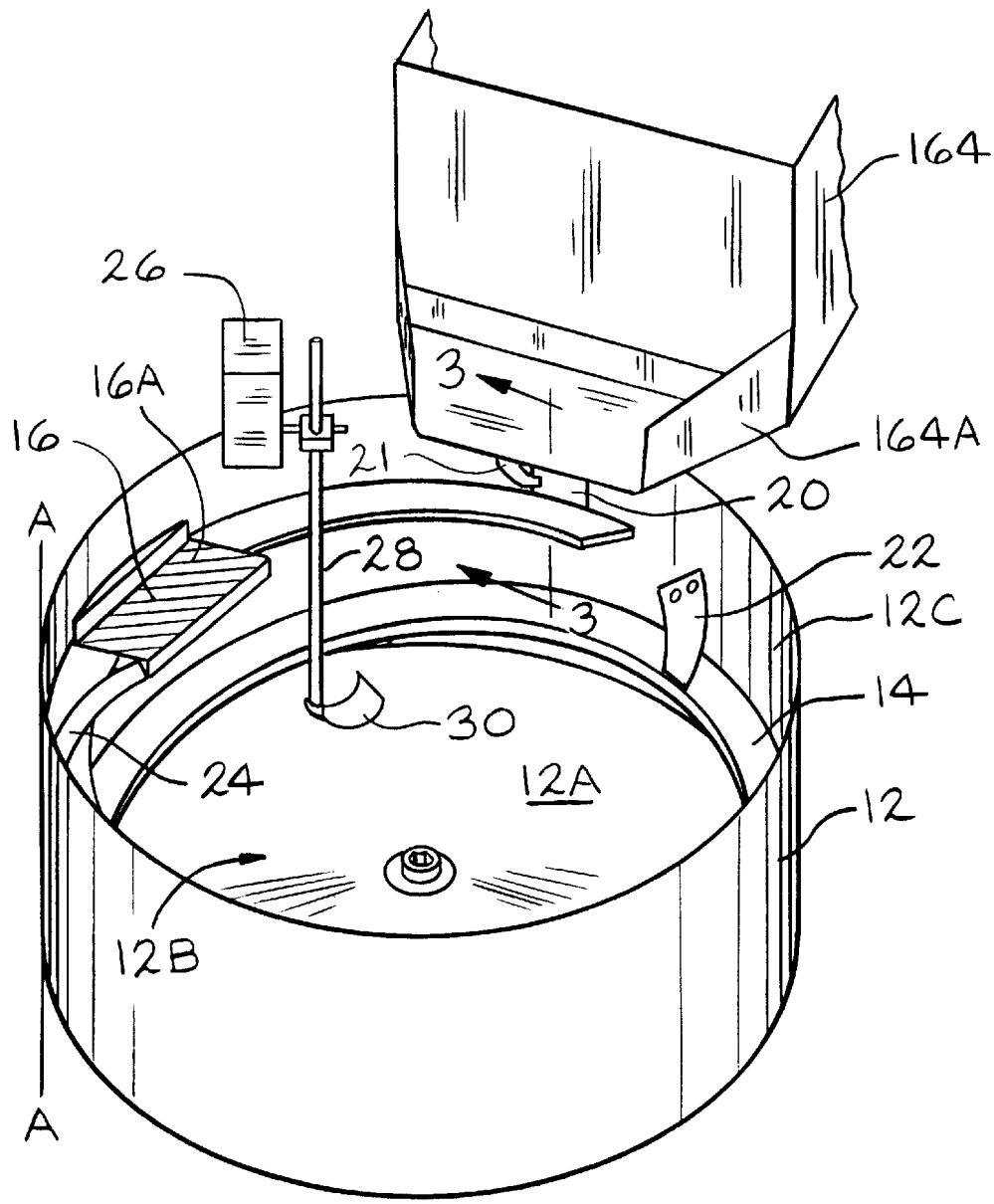

The vibratory bowl 12 is preferably mounted on a table or frame 162 above a ground surface (FIG. 1). The vibratory bowl 12 is preferably mounted on the table 162 with resilient blocks or shocks (not shown) spaced between the bowl 12 and the table 162. The shocks reduce the vibration of the frame 162 and noise of the apparatus 10. In the preferred embodiment, the bowl 12 has an electromagnet (not shown) with sheet springs (not shown) to vibrate the bowl 12 and effectively move the parts 150, 250, 350 or 450 along the ramp 14. The vibrating mechanism is preferably similar to vibrating mechanisms for vibratory bowls well known in the art. A hopper 164 for supplying parts 150, 250, 350 or 450 to the bowl 12 is positioned above the bowl 12 (FIGS. 1 and 2). The hopper 164 is preferably also mounted on the table 162. In the preferred embodiment, the hopper 164 is spaced above and to one side of the bowl 12. The hopper 164 preferably has an outlet ramp 164A which directs the parts 150, 250, 350 or 450 toward the center of the bottom 12A of the bowl 12. The hopper 164 is preferably mounted at about a 7° angle downward from the horizontal at the top 12B of the bowl 12. In the preferred embodiment, the hopper 164 has a size of ¼ cubic foot or larger.

As seen in FIG. 2, the vibratory bin or bowl 12 preferably has a closed bottom 12A and an open top 12B with a sidewall 12C extending therebetween. The bowl 12 has a circular cross-section. Thus, the inner surface of the sidewall 12C preferably has a concave curvature. In the preferred embodiment, the bowl 12 has a diameter of 12.0 inches (30.5 cm). A ramp or track 14 is mounted on the inner surface of the sidewall 12C of the bowl 12 and extends in an upward spiral from the bottom 12A of the bowl 12 to a parts outlet or opening 21 in the sidewall 12C of the bowl 12 adjacent the open top 12B of the bowl 12 (FIG. 2). The ramp 14 preferably extends 2¼ revolutions around the inner surface of the sidewall 12C. The first revolution of the ramp 14 preferably begins at the bottom 12A of the bowl 12 and extends to about 2.250 inches (5.715 cm) above the bottom 12A of the bowl 12. The second revolution extends from about 2.250 inches (5.715 cm) above the bottom 12A of the bowl 12 to about 4.000 inches (10.160 cm) above the bottom 12A of the bowl 12. The last quarter revolution of the ramp 14 about half way between the gauge 16, 216, 316 or 416 and the end of the ramp 14 preferably remains level at 4.000 inches (10.16 cm) above the bottom 12A of the bowl 12. In the preferred embodiment, the sidewall 12C of the bowl 12 has a height of 5.00 inches (12.70 cm) from the bottom 12A of the bowl 12 and the ramp 14 has an upward angle of incline of about 4.75°. The sidewall 12C of the bowl 12 can also extend below the bottom 12A of the bowl 12. The ramp 14 is preferably angled with respect to the sidewall 12C of the bowl 12. Preferably, the ramp 14 has an upward angle of 95° from the vertical axis A—A of the sidewall 12C of the bowl 12 (FIG. 2). Thus, the parts 150, 250, 350 or 450 tend to move toward the sidewall 12C as they move along the ramp 14. Preferably, after about 1¾ revolutions of the ramp 14 from the bottom 12A of the bowl 12, a gauge 16, 216, 316 or 416 is provided in the ramp 14. At the point where the ramp 14 meets the gauge 16, 216, 316 or 416, preferably the ramp 14 slants back to level or 90° with the vertical axis A—A of the sidewall 12C. After the gauge 16, 216, 316 or 416, the ramp 14 preferably again slants upward preferably about 120° with respect to the vertical axis A—A of the sidewall 12C. In the preferred embodiment, the ramp 14 has a width of 1.00 inches (2.54 cm) for the first 1¾ revolutions up to and after the gauge 16, 216, 316 or 416.

To insert the gauge 16, 216, 316 or 416, a portion of the ramp 14 is removed. Preferably, a 4.00 inch (10.16 cm) section of ramp 14 is removed to allow for insertion of the gauge 16, 216, 316 or 416. The sidewall 12C of the bowl 12 preferably remains intact. The bottom plate 18, 218, 318 or 418 of the gauge 16, 216, 316 or 416 preferably has a straight, inner edge adjacent the sidewall 12C and does not curve with the inner surface of the sidewall 12C. The type of gauge 16, 216, 316 or 416 which is used in the bowl 12 depends on the type of part 150, 250, 350 or 450 which is to be used in the apparatus 10.

Figure 10:
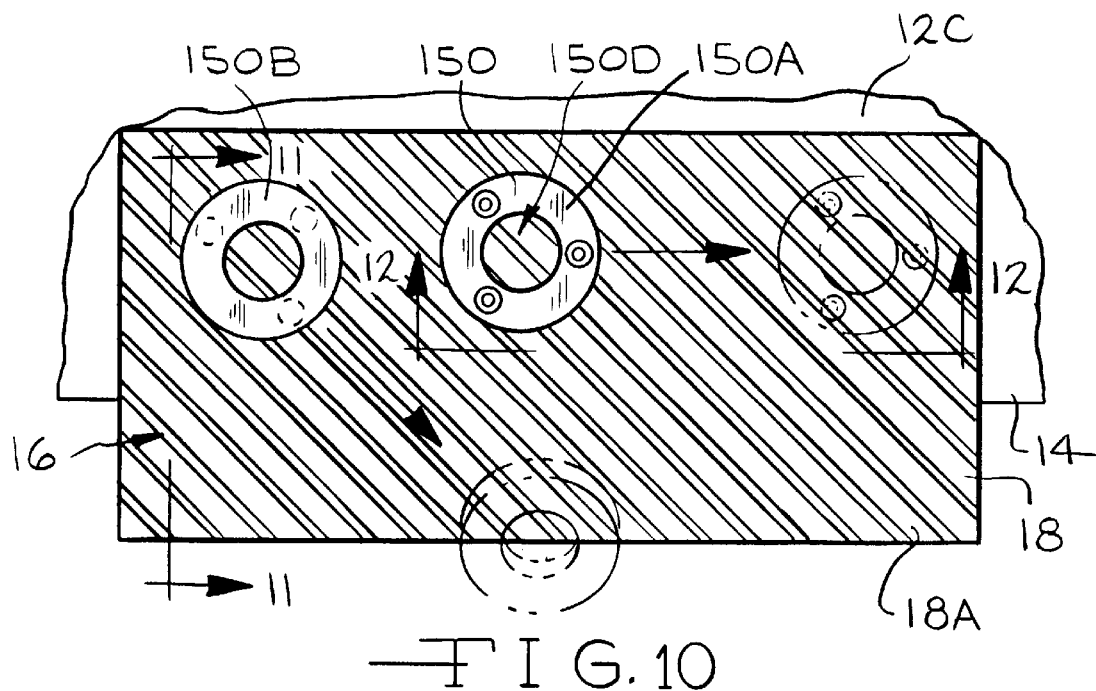
Figure 11:
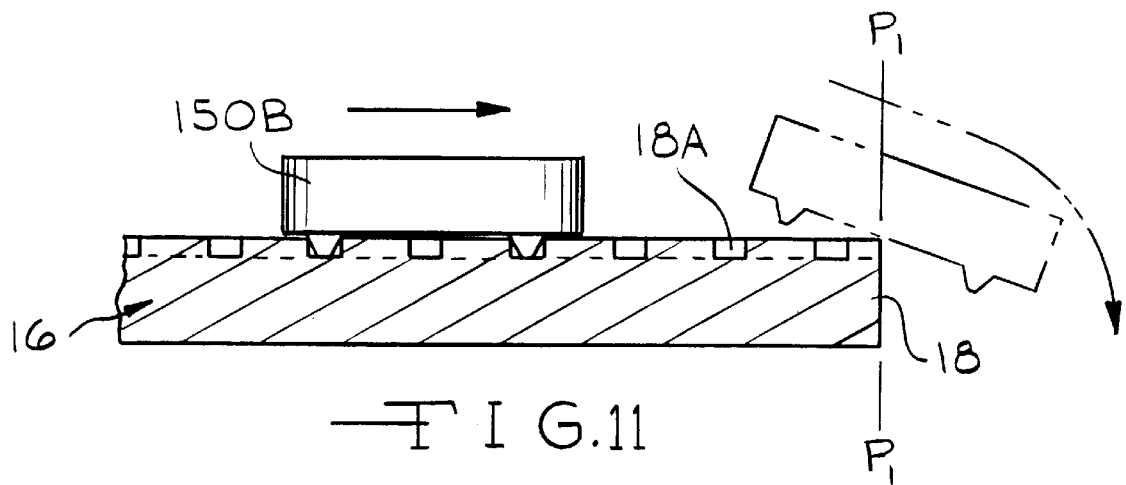
Figure 12:
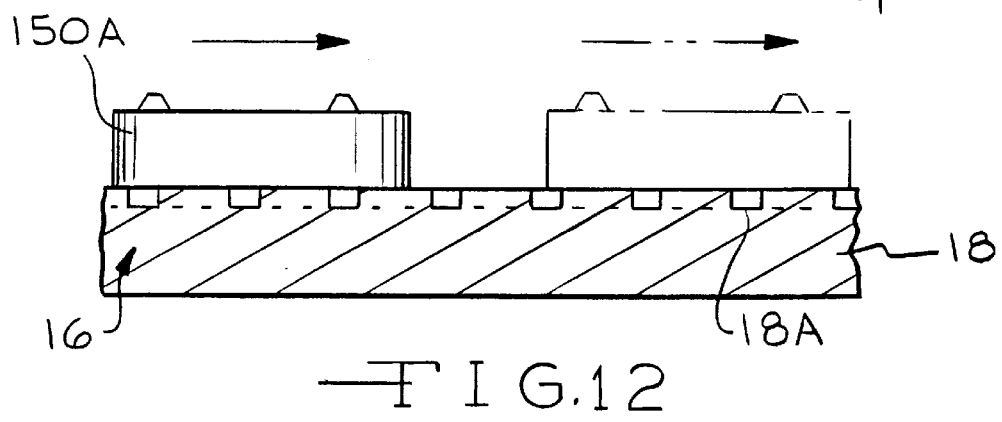

In a first embodiment, the gauge 16 includes a bottom plate 18 having a series of angled grooves 18A (FIGS. 10 to 12). The grooves 18A are angled in the direction of travel of the parts 150 and away from the sidewall 12C of the bowl 12. The grooves 18A are of such a width as to accommodate protrusions 150C on the parts 150 (FIG. 11).

In a second embodiment, the gauge 216 includes a bottom plate 218 and a top plate 220 mounted together along one side adjacent the sidewall 12C of the bowl 12 such as to form a slot 222 between the plates 218 and 220 (FIGS. 13 to 15). The width of the slot 222 is preferably such as to easily accommodate a flange 250C on the part 250. The top plate 220 preferably has a width less than the width of the bottom plate 218 (FIG. 13). The width of the top plate 220 is such that when the flange 250C of the part 250 contacts the top plate 220, the plate 220 moves the part 250 such that the center line P2—P2 of the part 250 is beyond the outer edge 218A of the bottom plate 218 (FIG. 15).

In a third embodiment, the gauge 316 includes a bottom plate 318 and a top plate 320 (FIGS. 16 to 18). The top plate 320 preferably has a width less than the width of the bottom plate 318. The plates 318 and 320 are preferably mounted together along one side adjacent the sidewall 12C. In the third embodiment, preferably there is no slot between the plates 318 and 320. The bottom plate 318 of the gauge 316 has a channel 318B forming a lip 318C along the outer edge 318A of the plate 318 opposite the sidewall 12C of the bowl 12. The lip 318C preferably has a height approximately equal to the height of a pilot 350C on the part 350. An ejector 322 is preferably mounted in the channel 318B of the bottom plate 318 adjacent the connection of the top and bottom plates 318 and 320. The ejector 322 is preferably angled on the leading edge 322A to move the part 350 toward the lip 318C on the bottom plate 318. The minimum distance between the ejector 322 and the lip 318C is equal to or slightly greater than the diameter or width of the pilot 350C of the part 350.

In a fourth embodiment, the gauge 416 preferably includes a bottom plate 418 and a top plate 420 (FIGS. 19 to 21). The plates 418 and 420 are preferably mounted along one side adjacent the sidewall 12C of the bowl 12. The bottom plate 418 preferably has an opening 418B spaced between the ends and the edges of the bottom plate 418. The top plate 420 preferably has a width less than the bottom plate 418 but extends over the opening 418B of the bottom plate 418. The width of the top plate 420 is such as to contact the part 450 to move the part 450 toward the outer edge 418A of the bottom plate 418 such that a pilot 450C of the part 450 moves along the outer edge 418A of the bottom plate 418.

In the preferred embodiment, the gauges 16, 216, 316 or 416 of all four (4) embodiments have the same length such as to be easily exchanged in the bowl 12. In addition, the width of the bottom plates 18, 218, 318 and 418 of the gauges 16, 216, 316 and 416 are preferably all equal or slightly greater than the width of the ramp 14 adjacent the gauge 16, 216, 316 or 416. The gauges 16, 216, 316 or 416 are preferably constructed of hardened steel.

Figure 3:
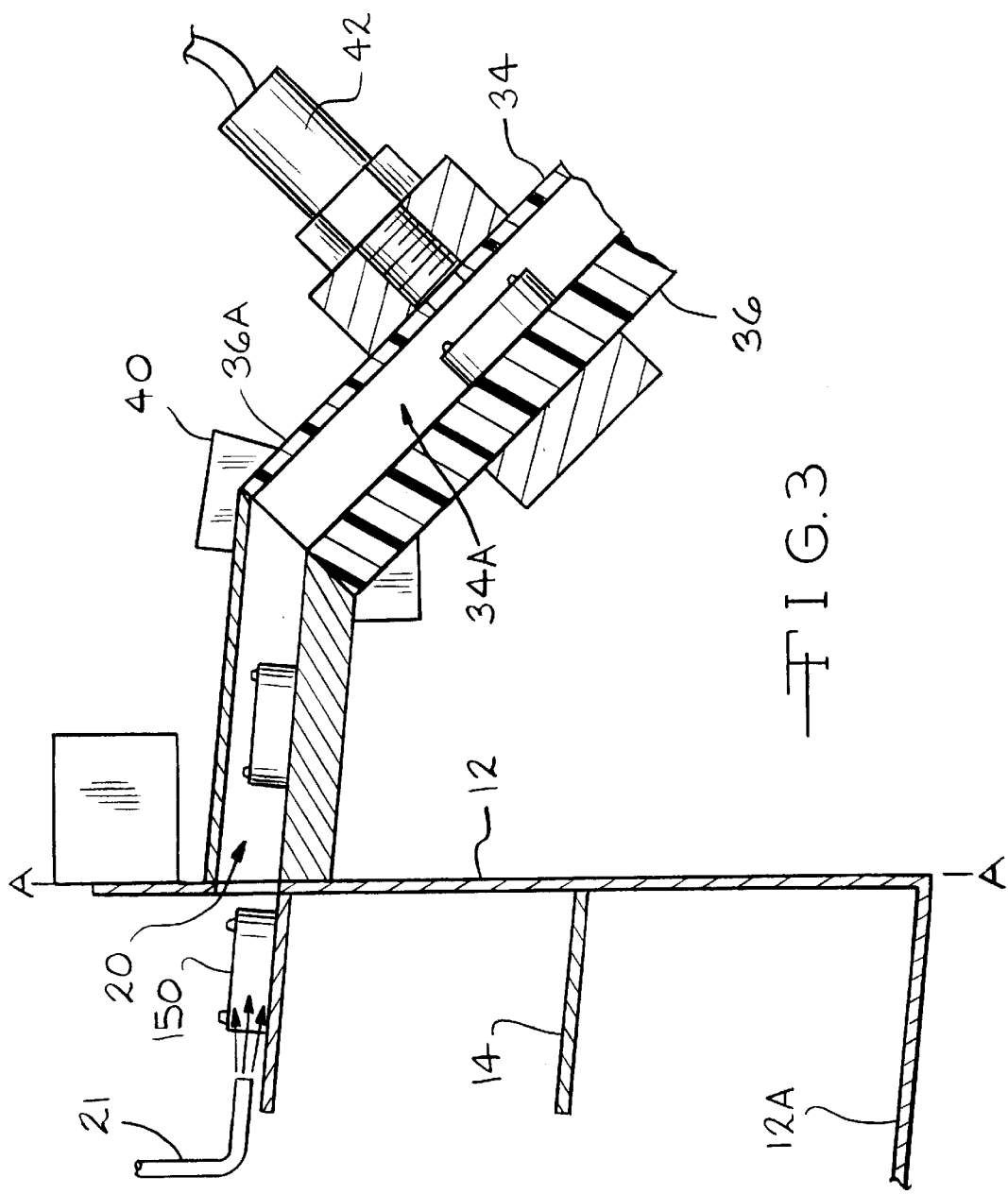

A parts outlet 20 is preferably located in the sidewall 12C of the bowl 12 adjacent the open top 12B. The parts outlet 20 is provided with an air assist jet 21 which provides a stream of air from the inside of the bowl 12 through the parts outlet 20. The size of the parts outlet 20 depends on the size of the part 150, 250, 350 or 450 being used. In the preferred embodiment, for parts 150, 250, 350 or 450 having an outside diameter of 0.980 inches (2.489 cm) and a height of 0.315 inches (0.800 cm) the outlet 20 has a width of 1.110 inches (2.819 cm) and a height of 0.380 inches (0.965 cm) (FIG. 3). The outlet 20 is preferably located in the sidewall 12C adjacent and slightly above the ramp 14 and spaced between the gauge 16, 216, 316 or 416 and the end of the ramp 14. In the preferred embodiment, the outlet 20 in the sidewall 12C is spaced about 6.0 to 8.0 inches (15.2 to 20.3 cm) from the gauge 16, 216, 316 or 416. The ramp 14 preferably extends beyond the outlet 20 at least about 2.000 inches (5.080 cm). In an alternate embodiment (not shown), the bowl is a dual feed bowl and the sidewall has two (2) identical parts outlets 20. In addition, in the alternate embodiment, a bypass block (not shown) is mounted on the ramp adjacent the first outlet. The block acts to move parts away from the sidewall of the bowl such that the parts can move past any parts blocking the first outlet such that the parts can move through the second outlet.

The bowl 12 has a first wiper 22 and a second wiper 24 mounted on the sidewall 12C such as to extend across the ramp 14 (FIG. 2). The first and second wipers 22 and 24 preferably have a similar construction and perform the same function. The second wiper 24 is a back up in case the first wiper 22 does not perform correctly and fully. The first wiper 22 is preferably located adjacent and above the ramp 14 after approximately 1¼ rotations of the ramp 14 from the bottom 12A of the bowl 12. The second wiper 24 is located just before the gauge 16, 216, 316 or 416. The wipers 22 or 24 are preferably formed from a rectangular piece of steel. The wipers 22 or 24 are preferably mounted at an angle such that the end of the wiper 22 or 24 opposite the sidewall 12C of the bowl 12 is lower and closer to the ramp 14 than the other end of the wiper 22 or 24 mounted to the sidewall 12C of the bowl 12.

The bowl 12 is also provided with a level sensor 26 which senses the level of parts 150, 250, 350 or 450 in the bowl 12 and stops the feed of parts 150, 250, 350 or 450 from the hopper 164 into the bowl 12 when the level of parts 150, 250, 350 or 450 is too high (FIG. 2). In the preferred embodiment, the level sensor 26 is a paddle switch which includes a paddle arm 28 which rotates or pivots upward to turn off the hopper 164 when parts 150, 250, 350 or 450 begin to fill the bottom 12A of the bowl 12 (FIG. 2). The bottom of the arm 28 preferably has a curved plate 30 which allows parts 150, 250, 350 or 450 to move under the arm 28 and pivot the arm 28 without jamming the arm 28.

Optionally, the bowl is also provided with a guide (not shown) spaced adjacent the sidewall 12C between the gauge 16, 216, 316 or 416 and the sidewall 12C. The guide acts to move the parts 150, 250, 350 or 450 toward the parts outlet 20.

The conveyance and feed system includes a conveyor conduit or chuting 34 extending from the parts outlet 20 in the sidewall 12C of the bowl 12 to an end track 72 adjacent the positioning cylinder 82. The conveyor conduit 34 is divided into a first section 36 and a second section 38. The first end 36A of the first section 36 is connected to the parts outlet 20 of the bowl 12 so that the parts 150, 250, 350 or 450 easily flow into the end of the conduit 34 (FIG. 3). The conduit 34 is preferably securely mounted to the outlet 20 of the bowl 12 by a mounting clamp 40 (FIG. 3). The first end 36A of the first section 36 of the conduit 34 is preferably provided with a first proximity switch 42 which acts to deactivate the hopper 164 when the first section 36 of the conduit 34 is full of parts 150, 250, 350 or 450. The first proximity switch 42 is preferably mounted on the first end 36A of the first section 36 of the conduit 34 adjacent the outlet 20 in the bowl 12. The first proximity switch 42 is preferably a sensory switch and senses the absence or presence of the parts 150, 250, 350 or 450 through the conduit 34 using electricity and magnetism. The proximity switch 42 is preferably similar to the IGA 2008ABOA manufactured by Efector, Inc. located in Michigan. The first section 36 of the conduit 34 preferably extends downward from the outlet 20 in the bowl 12 such that the parts 150, 250, 350 or 450 move along the first section 36 of the conduit 34 due to gravity. The first section 36 of the conduit 34 is preferably adjustably mounted to the table or frame 162 (FIG. 2). The second end 36B of the first section 36 of the conduit 34 is connected to the top end 44A of an escapement or parts feeder 44.

The escapement or parts feeder 44 includes a front plate 46 and a back plate 48 with mounting clamps 52 and 54 at each end for attachment of the conduit 34 (FIGS. 6 to 9). The second end 36B of the first section 36 of the conduit 34 is mounted by the mounting clamp 52 to the top end 44A of the escapement 44. The conduit 34 is mounted such that the parts 150, 250, 350 or 450 easily flow from the conduit 34 into the passageway 50 (to be described in detail hereinafter) in the escapement 44 without changing orientation. A channel 46A is formed on the inner surface of the front plate 46 on the side adjacent the back plate 48. The channel 46A extends completely between the ends of the front plate 46 such that when the plates 46 and 48 are mounted together, a passageway 50 is formed through the escapement 44. The top of the channel 46A adjacent the top end 44A of the escapement 44 is preferably chamfered to allow for easy entry of the parts 150, 250, 350 or 450 into the passageway 50 and to compensate for any misalignment of the parts 150, 250, 350 or 456. A first and second piston 56 and 58 are mounted on the outer surface of the back plate 48 on the side opposite the front plate 46. The pistons 56 and 58 are mounted such as to extend perpendicular through the back plate 48 and into the passageway 50 so that when the pistons 56 and 58 are extended, the piston blocks 60 and 62 of the pistons 56 and 58 extend into the passageway 50. The pistons 56 and 58 are mounted in a spaced apart relationship such that the second piston 58 is adjacent the top end 44A of the escapement 44 and the first piston 56 is adjacent the bottom end 44B of the escapement 44. The pistons 56 and 58 are spaced apart such that when the piston blocks 60 and 62 are extended into the passageway 50, a single part 150E is able to be located in the passageway 50 between the piston blocks 60 and 62 (FIG. 8). In the preferred embodiment, the piston blocks 60 and 62 are precisely positioned to fit only one and exactly one part 150E between the blocks 60 and 62. The piston blocks 60 and 62 preferably have a cylindrical shape with a diameter equal to or slightly greater than a diameter of the parts 150, 250, 350 or 450. The channel 46A in the front plate 46 has a width equal to or greater than the diameter of the piston blocks 60 and 62 and slightly greater than the parts 150, 250, 350 or 450 such that the piston blocks 60 and 62 can easily extend into the channel 46A and the parts 150, 250, 350 or 450 easily move through the passageway 50. However, preferably the width of the channel 46A is such that the parts 150, 250, 350 or 450 can not move extraneously, side to side within the channel 46A. The pistons 56 and 58 are of such a length as to be able to extend completely into the channel 46A. The width of the channel 46A and the size of the piston blocks 60 and 62 preferably depend on the size of the parts 150, 250, 350 or 450. The pistons 56 and 58 are preferably pneumatic. The plates 46 and 48 are preferably constructed of hardened steel. An air jet 64 is preferably mounted on the outer surface of the front plate 46 and is in fluid communication with a passageway 66 located in the front plate 46 of the escapement 44. In the preferred embodiment, the outlet of the passageway 66 is in the channel 46A across from the first piston block 60. The passageway 66 of the air jet 64 is preferably angled such as to provide a stream of air in the direction of movement of the parts 150, 250, 350 or 450 (FIG. 9).

The first end 38A of the second section 38 of the conduit 34 is mounted to the bottom end 44B of the escapement 44 using the mounting clamp 54 similarly to the mounting of the second end 36B of the first section 36 to the top end 44A of the escapement 44. The second section 38 is mounted such that the parts 156, 250, 350 or 450 flow easily from the escapement 44 into the second section 38 of the conduit 34 without changing orientation. The second end 38B of the second section 38 of the conduit 34 is preferably mounted using a mounting clamp 68 to the end track 72. The end track 72 is preferably spaced below the escapement 44 such that the parts 150, 250, 350 or 450 flow through the second section 38 of the conduit 34 from the escapement 44 to the end track 72 due to gravity. A second proximity switch 70 similar to the first proximity switch 42 is preferably located on the second section 38 of the conduit 34 adjacent the end track 72 (FIG. 4).

The conduit 34 preferably has a passageway 34A having a cross-sectional shape similar to the parts 150, 250, 350 or 450. In one embodiment, the part 150, 250, 350 or 450 is a nut and the conduit 34 has a rectangular cross-section. The cross-sectional shape and size of the conduit 34 is such that the parts 150, 250, 350 or 450 easily move through the passageway 34A in the conduit 34 but have limited side to side motion and are unable to change orientation in the passageway 34A of the conduit 34. In one embodiment, the conduit 34 is twisted or rotated between the ends such that the parts 150, 250, 350 or 450 have one orientation at the first end 36A of the first section 36 and have a different orientation as the parts 150, 250, 350 or 450 exit the conduit 34 at the second end 38A of the second section 38. The first and second sections 36 and 38 of the conduit 34 can be separately rotated. The conduit 34 would preferably be rotated 180° such that the orientation of the parts 150, 250, 350 or 450 is rotated 180° between the ends of the conduit 34. The first section 36 of the conduit 34 preferably has a length between the ends of about 18.0 to 24.0 inches (45.7 to 61.0 cm). The second section 38 of the conduit 34 preferably has a length of between 10 and 30 feet. (305 and 914 cm). However, the overall length of the conduit 34 and the length of the individual sections 36 and 38 of the conduit 34 preferably depends on the position of the apparatus 10 with respect to the work piece 160. The conduit 34 is preferably constructed of a semi-flexible ultra high molecular weight plastic (UHMW). However, the conduit 34 could also be constructed of steel.

Figure 4:
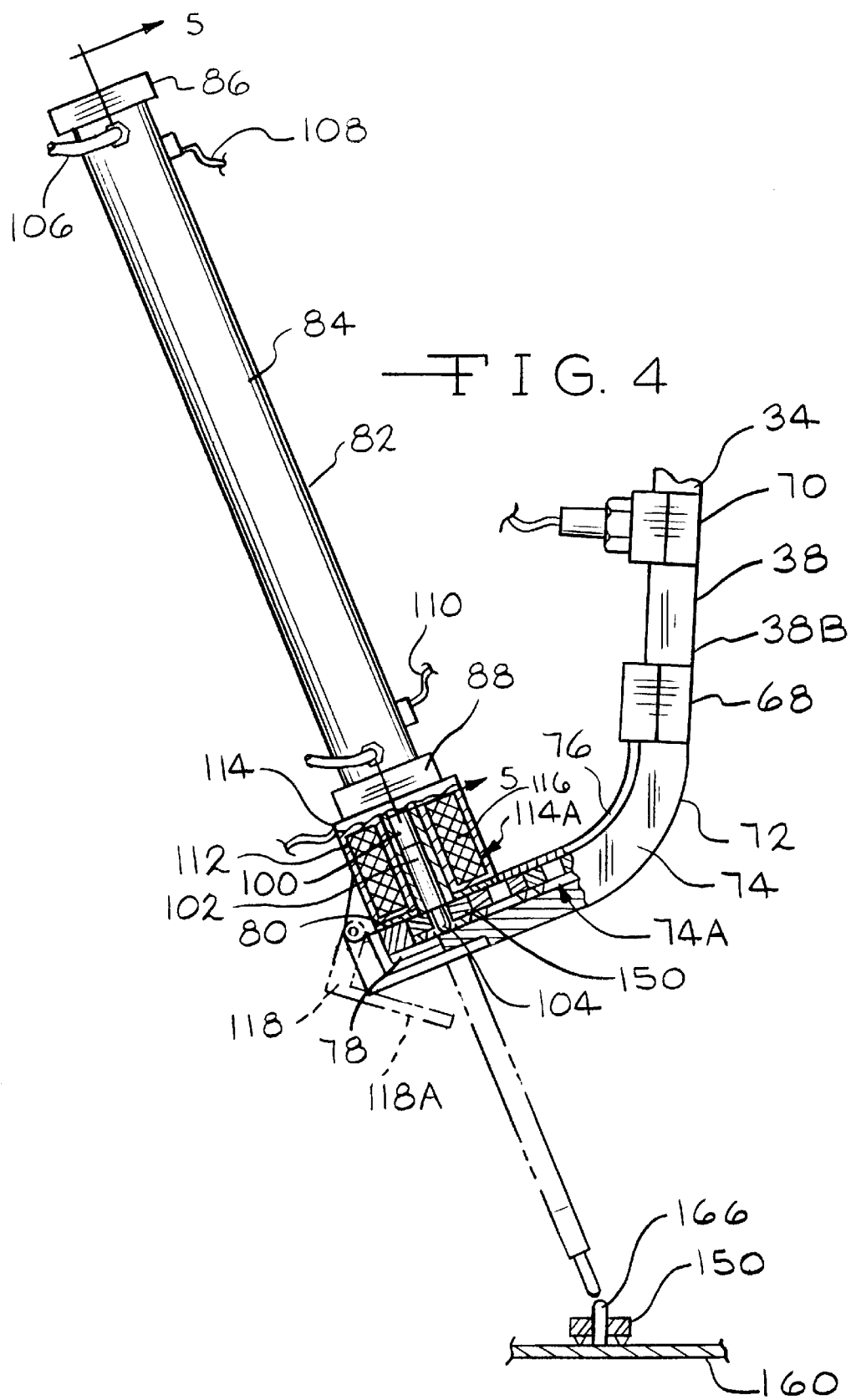
Figure 4A:
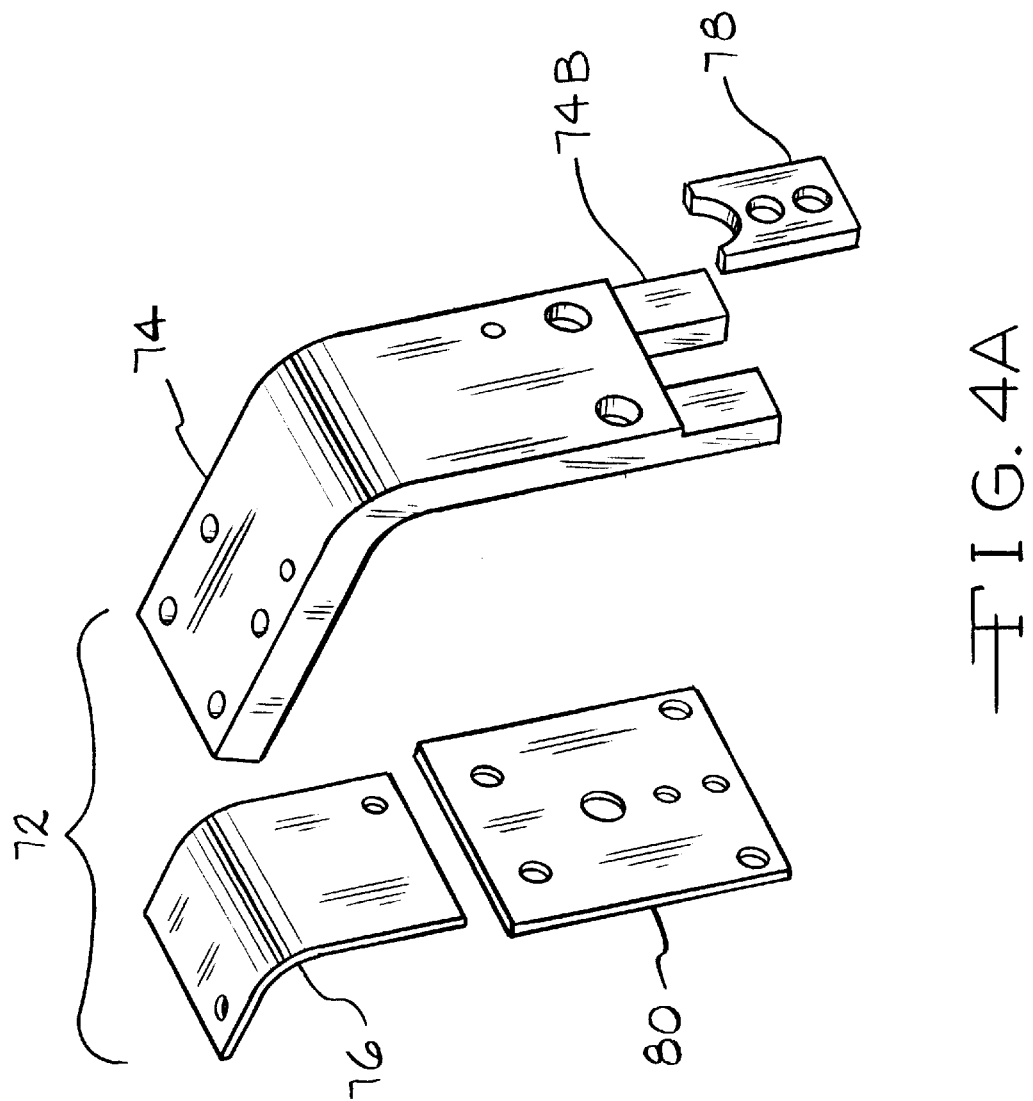

The end track 72 preferably extends from the second end 38B of the second section 38 of the conduit 34 to adjacent the electromagnet 112 on the end cap 88 of the positioning cylinder 84 (FIG. 4). The end track 72 preferably is angled between the ends such as to extend vertically from the second end 38B of the second section 38 of the conduit 34 and turn to a horizontal position adjacent the electromagnet 112. However, the shape of the end track 72 depends on the location of the positioning cylinder 84 and the position of the workpiece 160. The end track 72 preferably includes a bottom plate 74 and a top plate 76. The bottom plate 74 has a channel 74A within which the parts 150, 250, 350 or 450 move. The top plate 76 covers the channel 74A. The bottom plate 74 of the end track 72 extends from the mounting clamp 68 connecting the second end 38B of the second section 38 of the conduit 34 to the end track 72 to adjacent the opening 114B for the piston rod 100 in the electromagnet housing 114. The top plate 76 preferably extends from the mounting clamp 68 to adjacent the electromagnet housing 114. The positioning of the end track 72 ensures that when the parts 150, 250, 350 or 450 reach the end of the end track 72, one part 150, 250, 350 or 450 will be closely adjacent the opening 114B in the housing 114 through which the piston rod 100 will be extended. The end of the bottom plate 74 opposite the conduit 34 has a notch 74B which mounts around a part positioner 78 mounted around the opening 114B on the electromagnet housing 114 (FIG. 4A). The part positioner 78 abuts against a shoulder (not shown) located in the notch 74B of the bottom plate 74 of the end track 72. The shoulder acts to secure mount and correctly orient the part positioner 78 in the notch 74B in the bottom plate 74. The mating of the notch 74B and the part positioner 78 ensures that the end track 72 is correctly positioned with respect to the opening 114B through which the piston rod 100 will be extended. The top plate 76 of the end track 72 is preferably constructed of steel. The end of the end track 72 is preferably securely and removably mounted to the housing 114 of the electromagnet 112. A wear plate 80 is mounted between the housing 114 of the electromagnet 112 and the bottom plate 74 of the end track 72. The wear plate 80 has an opening which corresponds to the opening 114B in the housing 114. The bottom plate 74, wear plate 80 and part positioner 78 are preferably constructed of hardened steel.

The positioning cylinder 82 is mounted spaced apart from the table 162 having the vibratory bowl 12 and the escapement 44 adjacent the workpiece 160. The positioning cylinder 82 is preferably located below the vibratory bowl 12 such that the parts 150, 250, 350 or 450 move from the bowl 12 through the conduit 34 of the conveyance and feeding system to the end track 72 by gravity. The positioning cylinder 82 includes a cylinder 84, a cylinder piston 90 and a piston rod 100. The cylinder 84 has an essentially rectangular shape with four (4) sidewalls forming a square cross-section. The cylinder 84 has an inner bore 84A extending completely through the cylinder 84 having a cross-sectional shape similar to the cross-sectional shape of the cylinder piston 90. In the preferred embodiment, the bore 84A and piston 90 have a circular cross-section. The bore 84A of the cylinder 84 is closed at each end by end caps 86 and 88. One of the end caps 88 has an opening 88A extending there through to allow for extension of the piston rod 100 from the cylinder 84. The cylinder 84 preferably has a length of 14.750 inches (37.465 cm) without the end caps 86 and 88 and 15.750 inches (40.005 cm) with the end caps 86 and 88. The diameter of the piston 90 is preferably slightly less than the inner diameter of the bore 84A of the cylinder 84. The bore 84A preferably has a diameter of 1.500 inches (3.810 cm). The piston 90 preferably has a diameter of 1.230 inches (3.124 cm) and a length of 3.250 inches (8.255 cm) end to end. The cylinder piston 90 is slidably mounted in the bore 84A of the cylinder 84. The cylinder piston 90 includes a bumper 92 and piston seal 94 at each end 90A and 90B with a wear strip 96 and magnet 98 spaced between the ends 90A and 90B (FIG. 5). One of the ends 90B of the cylinder piston 90 has a threaded bore 90G which extends coaxial with the longitudinal axis of the piston 90. The piston 90 is preferably fully reversible such as to simplify construction of the cylinder 84. In the preferred embodiment, the diameter of the piston 90 remains the same while the diameter of the piston rod 100, extension 102 and tip 104 (to be described in detail hereinafter) are varied to accommodate different sized parts 150, 250, 350 or 450. The bumpers 92 are mounted in grooves 90C adjacent the ends 90A and 90B of the piston 90. The ends 90A and 90B of the pistons 90 preferably have a diameter smaller than the diameter of the piston 90. The bumpers 92 extend outward beyond the ends 90A and 90B of the piston 90 such that the bumpers 92 make contact with the end caps 86 and 88 of the cylinder 84 and prevent the ends 90A and 90B of the piston 90 from making contact with the end caps 86 and 88. The bumpers 92 have an outer diameter less than the diameter of the bore 84A of the cylinder 84. The bumpers 92 are preferably constructed of nylon. The piston seals 94 are mounted in grooves 90D adjacent each of the bumpers 92 on the side opposite the ends 90A and 90B of the cylinder piston 90. The seals 94 have a diameter equal to or greater than the diameter of the bore 84A. Consequently, the seals 94 are in contact with the inner surface of the bore 84A. The seals 94 prevent air from moving past the piston 90 which allows the air to be used to move the cylinder piston 90. The seals 94 are preferably constructed of nylon. A wear strip 96 is removably mounted in a groove 90E in the piston 90 spaced between the piston seals 94. The wear strip 96 has an outer diameter greater than the diameter of the bore 84A. Thus, as the piston 90 moves in the bore 84A, the wear strip 96 is in constant contact with the surface of the bore 84A. The wear strip 96 preferably has a circular shape with a slit which allows for easy replacement of the strip 96 in the groove 90E. The wear strip 96 is preferably constructed of a resilient material such as Teflon®. The magnet 98 is mounted in a groove 90F spaced between the wear strip 96 and one of the piston seals 94. The magnet 98 preferably has an outer diameter less than or equal to the diameter of the piston 90 such that when the piston 90 moves in the cylinder 84, the magnet 98 does not contact the surface of the bore 84A. The piston 90 is preferably constructed of aluminum.

The piston rod 100 has opposed ends 100A and 100B with threads at both ends 100A and 100B and is threadably mounted at one end 100A in the threaded bore 90G in one end 90B of the cylinder piston 90 (FIG. 5). The diameter of the rod 100 varies depending on the outer diameter of the parts 150, 250, 350 or 450 to be positioned. The rod 100 preferably has a diameter between about 0.25 to 0.625 inches (0.64 to 1.588 cm). The rod 100 preferably has an overall length of about 15.125 inches (38.418 cm) and is constructed of a magnetic material such as steel. An extension 102 and tip 104 are mounted on the other end 100B of the rod 100 opposite the piston 90. The extension 102 has a threaded bore at each end 102A and 102B and is threadably mounted at one end 102A on one threaded end 100B of the rod 100. The extension 102 preferably has a diameter similar to the diameter of the rod 100. The extension 102 preferably has a length of between 2.50 and 2.00 inches (6.35 to 5.08 cm) depending on the diameter of the rod 100. The length of the extension 102 is preferably inversely proportional to the diameter of the rod 100. The extension 102 is constructed of a magnetic material such as steel. The extension 102 is also preferably heat treated to ensure longer use and less wear. The tip 104 is preferably threadably mounted in the other end 102B of the extension 102 opposite the rod 100. Initially, the tip 104 has a diameter equal to the diameter of the rod 100 and extension 102. However, after the tip 104 is securely mounted in the extension 102, the tip 104 is ground down such as to easily fit within the opening 150D, 250D, 350D or 450D of the part 150, 250, 350 or 450 without extensive movement of the part 150, 250, 350 or 450 on the tip 104. Preferably, the outer diameter of the ground down tip 104 is 0.010 to 0.015 inches (0.025 to 0.038 cm) smaller than the inner diameter of the opening 150D, 250D, 350D or 450D of the parts 150, 250, 350 or 450. To securely mount the tip 104 in the extension 102, the threads are provided with an adhesive such as Loctite® manufactured by Loctite Corporation. The end 104B of the tip 104 opposite the extension 102 is also rounded during grinding to reduce the possibility of damage to the part 150, 250, 350 or 450. In the preferred embodiment, the length of the tip 104 extending beyond the extension 102 is directly proportional to the diameter of the rod 100 and extension 102. In the preferred embodiment, the tip 104 has a length of between about 0.500 to 1.000 inches (1.27 to 2.54 cm). The tip 104 is constructed of a non-magnetic material such as stainless steel.

In an alternate embodiment, the extension 202 has a bore 202E extending completely through the extension 202 with both ends 202C and 202D of the bore 202E being threaded (FIG. 5A). The extension 202 is mounted at one end 202A to the rod 100 similar to the preferred embodiment. The tip 204 is mounted on the other end 202B of the extension 202 and ground down similarly to the preferred embodiment. The extension 202 is constructed of a non-magnetic material such as stainless steel. A magnet 203 is inserted into the bore 202E of the extension 202 and held within the bore 202E by the rod 200 and tip 204. The magnet 203 replaces the magnetic material of the extension 202 of the preferred embodiment.

The positioning cylinder 82 is preferably a pneumatic cylinder and has air inlets 106 in one sidewall of the cylinder 84 adjacent each of the end caps 86 and 88 of the positioning cylinder 82. The air inlets 106 preferably provide 20 to 60 lbs. of air to move the piston 90 in each direction within the cylinder 84.

Reed switches 108 and 110 are mounted on the outer surface of the cylinder 84 adjacent each end cap 86 and 88 of the positioning cylinder 82 (FIG. 5). The switches 108 and 110 are mounted on a sidewall of the cylinder 84 offset from the air inlets 106 90°. The reed switches 108 and 110 are preferably similar to the DB54L manufactured by SMC Pneumatic, Inc. located in Marcross, Georgia.

An electromagnet 112 is mounted on the end cap 88 of the positioning cylinder 82 having the opening 88A for extension of the piston rod 100. The electromagnet 112 includes an outer housing 114 having an inner cavity 114A within which the coil 116 of the electromagnet 112 is mounted. The electromagnet 112 is mounted on the end cap 88 of the positioning cylinder 82 such that the cavity 114A is adjacent the end cap 88 of the positioning cylinder 82. The cavity 114A extends only partially through the housing 114. The housing 114 has a square shape and the cavity 114A has a spherical shape. The housing 114 of the electromagnet 112 is constructed of a non-magnetic material such as aluminum. The housing 114 has an opening 114B in the end opposite the cavity 114A which is coaxial with the center of the cavity 114A and the piston rod 100 when the electromagnet 112 is mounted on the end cap 88 of the positioning cylinder 82. The size of the electromagnet 112 or number of windings in the coil 116 is preferably determined by the diameter of the piston rod 100 and the size of the part 150, 250, 350 or 450 to be positioned. In the preferred embodiment, the same size coil 116 having 2500 windings using #30 or #32 wire is used for a positioning cylinder 82 having a piston rod 100 with a diameter of between about 0.25 and 0.625 inches (0.64 and 1.588 cm).

A holding door 118 is mounted on a side of the housing 114 opposite the top plate 76 of the end track 72 (FIG. 4). The door 118 is L-shaped and is mounted such that one leg 118A of the door 118 extends adjacent the part positioner 78 mounted on the wear plate 80 adjacent the housing 114 of the electromagnet 112. The door 118 has a notch (not shown) in the end of the one leg 118A opposite the other leg 118B. When the door 118 is in the closed position, the notch coincides with the notch 74B of the bottom plate 74 of the end track 72 and the opening 114B in the housing 114 of the electromagnet 112 (FIG. 4). The notch is of a size as to allow the tip 104 of the piston rod 100 to extend beyond the door 118 while maintaining the part 150, 250, 350 or 450 in position adjacent the part positioner 78. The door 118 has a spring (not shown) which biases the door 118 into the closed position when the piston rod 100 is retracted.

The apparatus 10 is preferably controlled by a PLC micro controller 120 having programmable logic and an externally mounted programmable DTAM (keypad) 122. The micro controller 120 has a variety of timers and variables which can be adjusted for each individual user. The PLC micro controller 120 is preferably similar to the micro controller sold under the trademark MICROVIEW™ by Allen-Bradley. The apparatus 10 can also be operated manually by the user manually activating the switches.

To begin operation of the apparatus 10, the apparatus 10 is powered up and the controller 120 runs through a check of the apparatus 10 using the first and second proximity switches 42 and 70 to determine the status and location of the parts 150, 250, 350 or 450 in the apparatus 10. If both the first and second proximity switches 42 and 70 sense parts 150, 250, 350 or 450 then the apparatus 10 is ready to proceed. The apparatus 10 then remains idle until a signal to position a part 150, 250, 350 or 450 is received. If no part 150, 250, 350 or 450 is sensed by the first proximity switch 42, then the bowl 12 is activated to supply parts 150, 250, 350 or 450 to the first section 36 of the conduit 34. The escapement 44 is preferably placed in the start off position with both piston blocks 60 and 62 fully extended into the passageway 50 of the escapement 44 (FIG. 6). Thus, the piston blocks 60 and 62 prevent the parts 150, 250, 350 or 450 from moving through the escapement 44 and allow the parts 150, 250, 350 or 450 to be stacked up in the first section 36 of the conduit 34.

To provide parts 150, 250, 350 or 450 to the conduit 34, the hopper 164 is first provided with a supply of parts 150, 250, 350 or 450. Next, the vibratory bowl 12 is activated. The hopper 164 is then activated to move the parts 150, 250, 350 or 450 from the hopper 164 into the vibratory bowl 12. The micro controller 120 is preferably programmed such that the hopper 164 can only be activated when both the level sensor 26 does not sense parts 150, 250, 350 or 450 in the bowl 12 and the bowl 12 is activated.

As the bowl 12 is filled with parts 150, 250, 350 or 450, the arm 28 of the level sensor 26 contacts the parts 150, 250, 350 or 450 in the bottom 12A of the bowl 12 which acts to pivot the arm 28 upward. Once the arm 28 pivots upward a set amount, the level sensor 26 deactivates the hopper 164 which stops the flow of parts 150, 250, 350 or 450 into the bowl 12. The activating depth for the parts 150, 250, 350 or 450 can be varied by the user. Once in the bowl 12, the parts 150, 250, 350 or 450 are vibrated up and around the ramp 14 inside the bowl 12. As the parts 150, 250, 350 or 450 move around the ramp 14, the parts 150, 250, 350 or 450 pass by and under the first wiper 22. The positioning of the first wiper 22 with respect to the ramp 14 enables the wiper 22 to remove any parts 150, 250, 350 or 450 which form a second layer. The positioning of the first wiper 22 also allows the wiper 22 to remove any parts 150, 250, 350 or 450 that do not form part of a single file row. The first wiper 22 is angled such that the extra parts 150, 250, 350 or 450 are smoothly removed from the ramp 14 and deposited back into the bottom 12A of the bowl 12. The single layer, single file row of parts 150, 250, 350 or 450 continues moving along the ramp 14 and moves by and under the second wiper 24. The second wiper 24 operates similarly to the first wiper 22 and removes any excess parts 150, 250, 350 or 450 which are not part of the single layer, single file row. In the preferred embodiment, the second wiper 24 is a back up and the parts 150, 250, 350 or 450 are reduced to a single layer, single file row by the first wiper 22. The parts 150, 250, 350 or 450 next move past a gauge 16, 216, 316 or 416 which removes any parts 150, 250, 350 or 450 which are incorrectly orientated. The type of gauge 16, 216, 316 or 416 which is used depends on the type of part 150, 250, 350 or 450 which is being orientated.

In the first embodiment, the part 150 is a nut or other type of fastener having protrusions 150C extending out, parallel to the center axis $P_1$—$P_1$ extending through the center of the center opening 150D of the nut. The angled grooves 18A of the gauge 16 engage the protrusions 150C of a part 150B which is incorrectly orientated with the protrusions 150C facing downward moves along the gauge 16. The angled grooves 18A slowly move the part 150B away from the sidewall 12C of the bowl 12 and over the outer edge of the gauge 16. If the part 150A is correctly orientated with the protrusions 150C facing upward, the part 150A moves smoothly along the surface of the gauge 16 toward the parts outlet 20.

In the second embodiment, the part 250 is a hex nut, round nut or other fastener having a flange 250C on one side of the nut coaxial with the center axis $P_2$—$P_2$ of the nut extending through the center opening 250D of the nut (FIGS. 13 to 15). The flange 250C has a diameter larger than the diameter of the nut. When the part 250B is incorrectly orientated with the flange 250C facing upward, the top plate 220 of the gauge 216 engages the flange 250C and moves the part 250B away from the sidewall 12C of the bowl 12 and off the outer edge 218A of the bottom plate 218. The top plate 220 moves the nut such that the center axis $P_2$—$P_2$ extending through the center of the center opening 250D of the part 250B is beyond the outer edge 218A of the bottom plate 218 and the part 250B falls off the bottom plate 218 due to gravity (FIG. 15). When the part 250A is correctly orientated with the flange 250C adjacent the bottom plate 218, the flange 250C slides in the slot 222 between the plates 218 and 220. This allows the center part of the part 250A to be completely on the bottom plate 218 (FIG. 14) such that the part 250A remains on the gauge 216 and moves toward the parts outlet 20.

In the third embodiment, the part 350 is a hex nut, round nut or other fastener having a pilot 350C extending around the center opening 350D of the part 350 (FIGS. 16 to 18). When a part 350B having an incorrect orientation with the pilot 318C facing upwards, moves along the bottom plate 318 of the gauge 316, the ejector 322 contacts the part 350B and moves the part 350B toward the outer edge 318A of the bottom plate 318. The ejector 322 moves the part 350B until the center axis $P_3$—$P_3$ of the part 350 which extends through the center of the center opening 350D of the part 350 is beyond the outer edge 318A of the bottom plate 318 and the part 350B falls off the plate 318 due to gravity (FIG. 17). When the part 350A is correctly orientated with the pilot 350C facing downward, the ejector 322 makes contact with the pilot 350C and tends to move the part 350A toward the outer edge 318A of the bottom plate 318. However, the lip 318C at the outer edge 318A of the bottom plate 318 contacts the pilot 350C and prevents the part 350A from moving off the bottom plate 318. In addition, the part 350A can contact the outer edge 320A of the top plate 320 which assists in moving the part 350A toward the outer edge 318A of the bottom plate 318.

In the fourth embodiment, the part 450 is similar to the part 350 in the third embodiment and is a hex nut, round nut or miscellaneous fastener with a pilot 450C extending around the center opening 450D of the nut or fastener (FIGS. 19 to 21). In this embodiment, when the part 450B is incorrectly orientated with the pilot 450C facing upwards, the part 450B does not contact the top plate 420 as the part 450B moves across the gauge 416. Therefore, the part 450B is not correctly positioned on the outer edge 418A of the bottom plate 418. Consequently, the part 450B either falls over and off the outer edge 418A of the bottom plate 418 or fall inward through the opening 418B in the bottom plate 418. When the part 450A is correctly orientated with the pilot 450C facing downwards, the part 450A contacts the top plate 420 which acts to move the part 450A toward the outer edge 418A of the bottom plate 418. The part 450A is moved to a point where the center axis $P_4$—$P_4$ extending through the center of the center opening 450D of the part 450 is centered over the outer edge 418A of the bottom plate 418 and the part 450A does not fall over the edge or through the opening 418B in the bottom plate 418 and moves along the gauge 416 to the parts outlet 416.

Once the parts 150, 250, 350 or 450 move past the gauge 16, 216, 316 or 416, the parts 150, 250, 350 or 450 form a single layer, single file row of similarly orientated parts 150, 250, 350 or 450. As the parts 150, 250, 350 or 450 continue along the ramp 14 optionally, a guide (not shown) can be used adjacent the parts outlet 20 to assist in moving the parts 150, 250, 350 or 450 toward the outlet 20. In the alternate embodiment, where the apparatus feeds two parts simultaneously, a bypass block adjacent the first opening moves parts outward away from the sidewall of the bowl such that the parts will not be caught or engaged by previous parts which have not yet entered the first opening. The bypass block allows for flow of parts to the second opening regardless of whether or not the first opening is backed up with parts.

As the parts 150, 250, 350 or 450 move into the outlet 20 in the sidewall 12C, a stream of air from the air assist jet 21 within the bowl 12 moves the parts 150, 250, 350 or 450 through the outlet 20. The air assist jet 21 creates a venturi effect which helps to move the parts 150, 250, 350 or 450 faster through the outlet 20 in the sidewall 12C. In the preferred embodiment, the air assist jet 21 provides a constant stream of air to continually move the parts 150, 250, 350 or 450 through the outlet 20. Once the bowl 12 begins to move parts 150, 250, 350 or 450 through the outlet 20, the bowl 12 preferably provides a continuous flow of parts 150, 250, 350 or 450 through the outlet 20 until the bowl 12 is deactivated or the bowl 12 runs out of parts 150, 250, 350 or 450. The parts 150, 250, 350 or 450 continue to move from the bowl 12 to the conduit 34 until the first proximity switch 42 deactivates 42 the hopper 164 and the vibratory bowl 12. The proximity switch 42 deactivates the hopper 164 and bowl 12 in response to the continual sensing of a part 150, 250, 350 or 450 in the first section 36 of the conduit 34 for a preset amount of time and activates the hopper 164 and bowl 12 in response to a failure to sense a part 150, 250, 350 or 450. The proximity switch 42 may also deactivate the bowl 12 and hopper 164 when a timer (not shown) which is started when the apparatus 10 is first activated and a part 150, 250, 350 or 450 is not sensed by the proximity switch 42 times out. The preset length of time the first proximity switch 42 must read a part 150, 250, 350 or 450 continually before turning off the bowl 12 can be varied by the user in the micro controller 120. The location of the switch 42 can also be varied along the length of the first section 36 of conduit 34. In general, the switch 42 is activated when the parts 150, 250, 350 or 450 in the first section 36 of the conduit 34 extend completely from the second end 36B of the first section 36 of the conduit 34 to the switch 42. By activating and deactivating the bowl 12 and hopper 164, the life of the bowl 12 and hopper 164 can be extended. Deactivating the bowl 12 and hopper 164 also reduces the overall noise of the apparatus 10.

As soon as the parts 150, 250, 350 or 450 move through the outlet 20 in the sidewall 12C of the bowl 12, the parts 150, 250, 350 or 450 enter the first end 36A of the first section 36 of the conduit 34. The conduit 34 is orientated such as to accommodate the parts 150, 250, 350 or 450 having the orientation as determined by the bowl 12. The passageway 34A in the conduit 34 is such that the orientation of the parts 150, 250, 350 or 450 within the passageway 34A remains the same as the parts 150, 250, 350 or 450 move through the passageway 34A. As the parts 150, 250, 350 or 450 enter the first end 36A of the first section 36 of the conduit 34, the parts 150, 250, 350 or 450 move by gravity to the second end 36B of the first section 36 of the conduit 34 and the top end 44A of the escapement 44. Initially, as the parts 150, 250, 350 or 450 move into the top end 44A of the escapement 44, the first and second pistons 56 and 58 are extended such that the piston blocks 60 and 62 extend into the channel 46A and block the passageway 50 of the escapement 44 preventing the parts 150, 250, 350 or 450 from moving into the escapement 44 (FIG. 6). If during the initial start up check, the second proximity switch 70 senses a part 150, 250, 350 or 450, then the apparatus 10 will remain idle once the parts 150, 250, 350 or 450 are at the top 44A of the escapement 44 and in the first section 36 of the conduit 34 until the positioning cylinder 82 is activated to position parts 150, 250, 350 or 450 such that the second proximity switch 70 fails to sense a part 150, 250, 350 or 450 and activates the escapement 44. If during the initial start up the second proximity switch 70 does not sense a part 150, 250, 350 or 450, then the escapement 44 is activated to feed parts 150, 250, 350 or 450 to the second section 38 of the conduit 34, as soon as the parts 150, 250, 350 or 450 are stacked in the first section 36 of the conduit 34. When the escapement 44 is activated, the second piston block 62 is retracted from the passageway 50 of the escapement 44 and the parts 150, 250, 350 or 450 move into the passageway 50 until the parts 150, 250, 350 or 450 are adjacent the first piston block 60 (FIG. 7). Once the parts 150, 250, 350 or 450 are in the passageway 50, the second piston 58 is activated which extends the second piston block 62 into the channel 46A. However, due to the positioning and size of the piston block 62 and the size of the parts 150, 250, 350 or 450, when the second piston block 62 is extended, the block 62 contacts a second part 150F adjacent and in front of the second piston block 62 and traps and holds the second part 150F in the channel 46A (FIG. 8). A first part 150E is trapped between the first and second piston blocks 60 and 62 in the passageway 50. The first piston 56 is then activated to retract the first piston block 60 from the channel 46A. This opens the passageway 50 in the escapement 44 and allows the first part 150E to move out of the escapement 44 (FIG. 9). When the first piston 56 is retracted, the air jet 64 provides a stream of air through the passageway 66 into the passageway 50 adjacent the first piston block 60 in the direction of movement of the first part 150E. The air jet 64 creates a venturi which helps to move the first part 150E quickly out of the escapement 44. The length of time the air jet 64 provides a stream of air can preferably be varied in the controller 120. Once the first part 150E has left the escapement 44, the first piston 56 is reactivated to extend the first piston block 60 into the passageway 50. Finally, the second piston 58 is reactivated to retract the second piston block 62 from the passageway 50. Retracting the first piston block 60 allows the second part 150F to move down in the passageway 50 to the former position of the first part 150E and a third part 150G to move into the former position of the second part 150F. If the positioning cylinder 82 is positioning parts 150, 250, 350 or 450 and the second proximity switch 70 is not continually reading parts 150, 250, 350 or 450, the escapement process is then repeated starting with the extension of the second piston block 62.

The escapement 44 separates and feeds the parts 150, 250, 350 or 450 one at a time to the second section 38 of the conduit 34 and eventually the end track 72. The escapement 44 preferably feeds the parts 150, 250, 350 or 450 at a rate of between about 5 and 50 parts 150, 250, 350 or 450 per minute. However, preferably the rate of feed can be adjusted by the user. As the parts 150, 250, 350 or 450 exit the escapement 44; the parts 150, 250, 350 or 450 move along the second section 38 of the conduit 34 to the end track 72 due to gravity. If the parts 150, 250, 350 or 450 exiting the second end 38B of the second section 38 of the conduit 34 have the incorrect orientation with regard to the positioning cylinder 82 and the workpiece 160, the second section 38 of the conduit 34 can be rotated between the ends 36A and 36B to change the orientation of the parts 150, 250, 350 or 450.

The parts 150, 250, 350 or 450 are fed to the end track 72 until a part 150, 250, 350 or 450 is held in the part positioner 78 and the parts 150, 250, 350 or 450 are backed up to the second proximity switch 70. When the second proximity switch 70 senses a part 150, 250, 350 or 450 for a predetermined amount of time, the proximity switch 70 sends a signal to the controller 120 to deactivate the escapement 44 to stop feeding parts 150, 250, 350 or 450 into the second section 38 of the conduit 34. As with the first proximity switch 42, the predetermined amount of time can preferably be adjusted by the user. In the preferred embodiment, if the second proximity switch 70 does not sense a part 150, 250, 350 or 450 for a predetermined length of time, the switch 70 sends a signal to the controller 120 to shut down the welder interlink and prevent the welder from welding and the positioning cylinder 82 from extending. This will prevent any workpieces 160 from being welded without parts 150, 250, 350 or 450. Preferably, the timer will reset itself and restart the interlink as soon as the second proximity switch 70 senses a part 150, 250, 350 or 450. In the preferred embodiment, the predetermined amount of time is 0.5 seconds. It is necessary that the end track 72 be full of parts 150, 250, 350 or 450 so that the parts 150, 250, 350 or 450 will feed properly. Preferably, during normal operation, the escapement 44 will feed one part 150, 250, 350 or 450 for every part 150, 250, 350 or 450 placed on the workpiece 160 by the positioning cylinder 82. Once the end track 72 is full of parts 150, 250, 350 or 450, the part 150, 250, 350 or 450 held in the part positioner 78 is ready to be moved by the positioning cylinder 82.

Prior to moving the parts 150, 250, 350 or 450 to the end track 72 and the parts positioner 78, the piston 90 of the positioning cylinder 82 must be all the way to end of the cylinder 84 opposite the end track 72 with the piston rod 100 fully retracted. The position of the piston 90 is initially determined when the apparatus 10 first receives the signal to begin operation. The position of the piston 90 is determined by a signal from the upper reed switch 108. If the upper reed switch 108 makes contact with the magnet 98 on the piston 90, the upper reed switch 108 sends a signal to the controller 120 indicating that the cylinder rod 100 is in the fully retracted position and operation of the apparatus 10 can begin. If the upper reed switch 108 does not make contact with the magnet 98 on the cylinder 84, then operation of the apparatus 10 is delayed until the cylinder rod 100 is fully retracted.

When the parts 150, 250, 350 or 450 are correctly positioned at the end of the end track 72 in the part positioner 78 and held in place by the holding door 118, the positioning cylinder 82 receives a signal to move the piston 90 to extend the piston rod 100. As the piston 90 moves within the cylinder 84, the piston rod 100 moves out of the cylinder 84 into the electromagnet 112, the lower reed switch 110 makes contact with the magnet 98 on the piston 90 and sends a signal to the controller 120 to activate the electromagnet 112. When the electromagnet 112 is activated, the electromagnet 112 provides a charge in the piston rod 100 which transfers to the extension 102 mounted on the piston rod 100 which is constructed of a magnetic material. Since the tip 104 is constructed of a non-magnetic material, the tip 104 does not become magnetized. As the piston rod 100 continues to be extended, the tip 104 extends through the opening 150D, 250D, 350D or 450D in the part 150, 250, 350 or 450 which is held adjacent the opening 114B in the electromagnet housing 114 by the part positioner 78 and the holding door 118. The tip 104 extends into the opening 150D, 250D, 350D or 450D until the part 150, 250, 350 or 450 is adjacent and in contact with the shoulder formed at the connection of the tip 104 and the extension 102. Since the extension 102 is magnetized, the part 150, 250, 350 or 450 is held and in contact with the extension 102 at the end of the tip 104. The magnetic force of the extension 102 holds the parts 150, 250, 350 or 450 on the piston rod 100 with angles up to 85° downward from the horizontal. The electromagnet 112 may not be needed if the angle of placement of the parts 150, 250, 350 or 450 does not require additional force to hold the parts 150, 250, 350 or 450 on the tip 104. This would be true when the angle of placement is greater than or above horizontal. As the piston rod 100 continues to be extended, the part 150, 250, 350 or 450 and piston rod 100 contact the holding door 118 and pivot the holding door 118 out of the path of the part 150, 250, 350 or 450 and piston rod 100 (FIG. 4). The rod 100 is extended until the tip 104 and part 150, 250, 350 or 450 are adjacent the workpiece 160. In the preferred embodiment, the positioning cylinder 82 is positioned such that the piston 90 moves a full stroke to position the part 150, 250, 350 or 450 adjacent the workpiece 160. In the preferred embodiment, the tip 104 does not come in contact with the workpiece 160. As soon as the tip 104 and parts 150, 250, 350 or 450 are adjacent the workpiece 160, the forward movement of the piston rod 100 is stopped and the forward inertia of the part 150, 250, 350 or 450 overcomes the magnetic attraction between the extension 102 and the part 150, 250, 350 or 450 and moves the part 150, 250, 350 or 450 off the tip 104 and onto the workpiece 160. The magnetic attraction between the extension 102 and the part 150, 250, 350 or 450 is chosen such that the forward inertia of the part 150, 250, 350 or 450 is sufficient to easily overcome the magnetic attraction. In the preferred embodiment, the same size coil 116 can be used to move any of the parts 150, 250, 350 or 450 to be used in the apparatus 10. The apparatus 10 will preferably operate with standard, round, square or hex weld fasteners having a thread size of ³⁄₁₆ to ½ or M4 to M12. As soon as the signal is sent to the positioning cylinder 82 to extend the piston rod 100, a piston timer (not shown) is activated which retracts the piston rod 100 after the timer is timed out. The electromagnet 112 is also on a timer and is deactivated when the electromagnetic timer (not shown) is timed out. In the preferred embodiment, both of the timers can be adjusted by the user. In the preferred embodiment, the electromagnet 112 is not deactivated until the part 150, 250, 350 or 450 is deposited on the workpiece 160. However, the electromagnet 112 can be deactivated just prior to depositing the part 150, 250, 350 or 450 on the workpiece 160 to ensure that the forward inertia of the part 150, 250, 350 or 450 is sufficient to move the part 150, 250, 350 or 450 off the tip 104. It may be necessary to adjust the magnetic timer so that the part 150, 250, 350 or 450 will be held on the tip 104 as the rod 100 is extended and will be released from the tip 104 when the part 150, 250, 350 or 450 is adjacent the workpiece 160. In the alternate embodiment using the alternate extension 202, the electromagnet is not used. The strength of the magnet 203 in the extension 202 is chosen such that the forward inertia of the part 150, 250, 350 or 450 moves the part 150, 250, 350 or 450 off the extension 202 and tip 204. When the positioning cylinder 82 returns to its fully retracted position, the upper reed switch 108 makes contact with the magnet 98 on the piston 90 and sends a signal to the controller 120 which sends a signal to the user's machine telling it that it is all right to perform its function. In the preferred embodiment, the length of time between the positioning cylinder 82 returning to the fully retracted position and the signal to the user can be adjusted at the controller 120. Once the user's machine is done, the apparatus 10 repeats its operation. In the preferred embodiment, the apparatus 10 can provide a part 150, 250, 350 or 450 to a workpiece 160 at a rate of 5 to 50 parts 150, 250, 350 or 450 per minute.

The apparatus 10 can be used to place a round, square or hex weld fastener or nut, on the lower electrode of a resistance welding machine. The apparatus 10 can also be used to deposit the part 150, 250, 350 or 450 on a pin 166 on a workpiece 160 (FIG. 4).

It is intended that the foregoing description be only illustrative of the present invention and that the present invention be limited only by the hereinafter appended claims.

I claim:

1. A piston apparatus for positioning parts for mounting on workpieces, which comprises:
   (a) a piston cylinder having a first end and a second end;
   (b) a piston rod having a first end and a second end with the first end slidably mounted in the piston cylinder for movement between the ends of the piston cylinder such that the piston rod moves along a longitudinal axis of the cylinder, until the second end of the piston rod is inserted into an opening in the parts; and
   (c) an electromagnetic means mounted on the piston cylinder adjacent the second end of the piston cylinder for magnetizing a portion of the piston rod adjacent the second end of the piston rod such that the parts are held adjacent the second end of the piston rod by magnetic attraction between the parts and the portion of the piston rod.

2. The piston apparatus of claim 1 wherein an end holder means is pivotably mounted adjacent the second end of the piston cylinder and holds the part in position adjacent the second end of the piston rod and wherein the end holder means pivots out of a path of the piston rod as the piston rod is moved in a forward direction.

3. The piston apparatus of claim 1 wherein the piston rod is moved using air.

4. The piston apparatus of claim 1 wherein the piston cylinder is provided with locating switches which activate the electromagnetic means in response to a position of the piston rod within the cylinder.

5. The piston apparatus of claim 1 wherein when the piston rod is in a fully retracted position, the second end of the piston rod does not extend beyond the second end of the piston cylinder.

6. The piston apparatus of claim 1 wherein the second end of the piston rod is formed by a tip having a front portion and a back portion with the back portion spaced between the front portion and the first end of the piston rod, wherein the front portion has a size smaller than a size of the back portion and smaller than a size of an opening in the parts and wherein the size of the back portion is greater than the size of the opening in the parts.

7. The piston apparatus of claim 6 wherein the parts are nuts and the first portion of the tip of the piston rod extends through the opening in the nut.

8. The piston apparatus of claim 6 wherein the front portion of the tip is constructed of a non-magnetic material and the back portion of the tip is constructed of a magnetic material such that the back portion of the tip becomes magnetized while the front portion of the tip remains unmagnetized when the electromagnetic means is activated and wherein when the parts are mounted on the tip, the parts are held on the tip by the magnetic attraction between the parts and the back portion of the tip.

9. The piston apparatus of claim 8 wherein the tip and the piston rod are separate pieces.

10. The piston apparatus of claim 9 wherein the piston rod is constructed of a magnetic material.

* * * * *